US010518500B2

(12) United States Patent
Yashiki

(10) Patent No.: US 10,518,500 B2
(45) Date of Patent: Dec. 31, 2019

(54) LAMINATE COMPRISING A RELIEF STRUCTURE FORMING LAYER AND A MANUFACTURING METHOD FOR SAME

(71) Applicant: TOPPAN PRINTING CO., LTD., Taito-ku, Tokyo (JP)

(72) Inventor: Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 88 days.

(21) Appl. No.: 15/577,279

(22) PCT Filed: Jun. 2, 2016

(86) PCT No.: PCT/JP2016/002688
§ 371 (c)(1),
(2) Date: Nov. 27, 2017

(87) PCT Pub. No.: WO2016/194385
PCT Pub. Date: Dec. 8, 2016

(65) Prior Publication Data
US 2018/0154605 A1   Jun. 7, 2018

(30) Foreign Application Priority Data

Jun. 2, 2015   (JP) ................................. 2015-112623

(51) Int. Cl.
| | |
|---|---|
| *B32B 3/30* | (2006.01) |
| *B42D 25/324* | (2014.01) |
| *B32B 3/02* | (2006.01) |
| *G02B 5/18* | (2006.01) |
| *B42D 25/45* | (2014.01) |
| *B42D 25/328* | (2014.01) |
| *B32B 27/08* | (2006.01) |
| *B32B 27/36* | (2006.01) |
| *B42D 25/373* | (2014.01) |
| *B42D 25/445* | (2014.01) |
| *B42D 25/455* | (2014.01) |
| *B42D 25/46* | (2014.01) |
| *G02B 5/02* | (2006.01) |

(52) U.S. Cl.
CPC ................. *B32B 3/30* (2013.01); *B32B 3/02* (2013.01); *B32B 27/08* (2013.01); *B32B 27/36* (2013.01); *B42D 25/324* (2014.10); *B42D 25/328* (2014.10); *B42D 25/373* (2014.10); *B42D 25/445* (2014.10); *B42D 25/45* (2014.10); *B42D 25/455* (2014.10); *B42D 25/46* (2014.10); *G02B 5/021* (2013.01); *G02B 5/18* (2013.01); *G02B 5/1819* (2013.01); *B32B 2255/10* (2013.01); *B32B 2255/205* (2013.01); *B32B 2255/26* (2013.01); *B32B 2255/28* (2013.01); *B32B 2307/4023* (2013.01); *B32B 2307/416* (2013.01); *B32B 2451/00* (2013.01); *B32B 2551/00* (2013.01); *B32B 2554/00* (2013.01)

(58) Field of Classification Search
CPC ........... B32B 3/30; B32B 3/02; B42D 25/324; B42D 25/328; B42D 25/445; B42D 25/455; G02B 5/1819
See application file for complete search history.

(56) References Cited

U.S. PATENT DOCUMENTS

| | | | | |
|---|---|---|---|---|
| 5,820,971 | A * | 10/1998 | Kaule ..................... | B32B 38/04 428/209 |
| 7,637,537 | B2 * | 12/2009 | Keller .................... | B42D 25/00 283/109 |
| 7,667,895 | B2 * | 2/2010 | Argoitia ................... | B44F 1/08 359/566 |
| 2007/0206249 | A1 * | 9/2007 | Phillips .................... | C09J 11/02 359/2 |
| 2010/0116891 | A1 * | 5/2010 | Yano .................. | G11B 5/00808 235/488 |
| 2010/0253061 | A1 * | 10/2010 | Whiteman ........... | B42D 25/425 283/85 |

(Continued)

FOREIGN PATENT DOCUMENTS

| | | | |
|---|---|---|---|
| CN | 1039482 | C * | 2/1994 |
| CN | 101990497 | A * | 3/2011 |

(Continued)

OTHER PUBLICATIONS

Chen, Gang, et al., "Photoinduced Hyper-Reflective Laminated Liquid Crystal Film with Simultaneous Multicolor Reflection". ACS Applied Materials & Interfaces. 2014, 6, 1380-1384.*
International Search Report dated Aug. 30, 2016, in International Patent Application No. PCT/JP2016/002688, 2 pages.
International Preliminary Report on Patentability dated Dec. 14, 2017, in International Patent Application No. PCT/JP2016/002688, 10 pages.

(Continued)

*Primary Examiner* — Bret P Chen
(74) *Attorney, Agent, or Firm* — Squire Patton Boggs (US) LLP

(57) ABSTRACT

A laminate in which a first layer is formed with high positional accuracy, and a manufacturing method thereof is provided. In the laminate of this invention, a relief structure forming layer includes a first region having an indented structure extending in a first direction or a direction tilted by an angle within 10 degrees to the left or right from the first direction in a plan view, and a second region including an indented structure extending in a second direction orthogonal to the first direction or a direction tilted by an angle within 65 degrees to the left or right from the second direction in a plan view. The first layer contains a first material which is different from a material of the relief structure forming layer, and has a surface shape corresponding to that of the relief structure forming layer.

2 Claims, 33 Drawing Sheets

(56) References Cited

U.S. PATENT DOCUMENTS

| | | | | |
|---|---|---|---|---|
| 2011/0317271 A1* | 12/2011 | Dunn | ................... | G07D 7/0006 |
| | | | | 359/619 |
| 2012/0064303 A1 | 3/2012 | Yashiki et al. | | |
| 2012/0146323 A1* | 6/2012 | Schilling | .............. | G02B 3/0056 |
| | | | | 283/85 |
| 2012/0228860 A1* | 9/2012 | Rauch | ................... | B42D 25/29 |
| | | | | 283/85 |
| 2013/0063955 A1* | 3/2013 | Rinko | .................... | B32B 38/06 |
| | | | | 362/351 |
| 2013/0209676 A1* | 8/2013 | Yashiki | ................ | G02B 5/1842 |
| | | | | 427/162 |

FOREIGN PATENT DOCUMENTS

| | | | | |
|---|---|---|---|---|
| EP | 0497555 A1 * | 8/1992 | ............... | G03H 1/02 |
| EP | 0684908 B1 * | 2/1994 | ............. | B42D 15/10 |
| JP | 2524092 Y2 | 1/1997 | | |
| JP | 2007-118563 A | 5/2007 | | |
| JP | 4194073 B2 | 12/2008 | | |
| JP | 4319807 B2 | 8/2009 | | |
| JP | 2011-221330 A | 11/2011 | | |
| JP | 2012-063738 A | 3/2012 | | |
| JP | 2014-071442 A | 4/2014 | | |
| JP | 2015-123609 | * 7/2015 | | |

OTHER PUBLICATIONS

Extended European Search Report dated Apr. 10, 2018 in European Patent Application No. 16802825.6, 7 pages.

* cited by examiner

LAMINATE COMPRISING A RELIEF STRUCTURE FORMING LAYER AND A MANUFACTURING METHOD FOR SAME

TECHNICAL FIELD

Present invention relates to a laminate, and more specifically, to a laminate having a forgery prevention effect, a decorative effect, and/or an aesthetic effect.

BACKGROUND ART

Banknotes, securities, certificates, brand products, personal authentication media, and the like are expected to be forgery-proof. To this end, laminate (s) having an excellent forgery prevention effect may be attached to those items as appropriate.

Most of the laminates include a microstructure such as a diffraction grating, a hologram, a lens array, and a scattering structure. These microstructures are hard to analyze. And, to manufacture the laminates including one of these microstructures requires costly manufacturing equipment such as an electron beam lithography system. In consequence, the laminates can present an excellent forgery prevention effect.

Each of these laminates usually includes a relief structure forming layer with a principal surface that includes the microstructure, and a reflective layer provided thereon. In this case, the reflective layer in the form of a pattern may be provided only on part of the principal surface so as to further enhance the forgery prevention effect. For instance, a pattern in the form of micro characters that emit diffracted light is obtained by providing the reflective layer on the principal surface such that the contours of the reflective layer form the micro characters.

PTL 1 adopts the following method in order to form a reflective layer with high positional accuracy.

First, a relief structure forming layer is prepared which includes a "first region" that is provided with an indented structure having a high depth-to-width ratio, and a "second region" that is either flat or provided with an indented structure having a lower depth-to-width ratio. Next, a metal reflective layer is formed at a uniform surface density on this relief structure forming layer with a vacuum deposition method. Thereafter, a material having resistance to an etchant to etch the metal reflective layer is deposited at a uniform surface density with the vacuum deposition method, thus providing a "second layer". Subsequently, a laminate thus obtained is subjected to an etching treatment.

Of the "second layer", a portion corresponding to the "first region" is permeable to the etchant because a deposited film thereon is either a discontinuous film or a porous film, which is attributed to the indented structure having the high depth-to-width ratio. On the other hand, of the "second layer", a portion corresponding to the "second region" is not permeable to the etchant because the portion is either flat or provided with the indented structure having the lower depth-to-width ratio, and thus a deposited film thereon is a uniform continuous film.

Accordingly, by immersion of the obtained laminate in the etchant, only the portion of the metal reflective layer corresponding to the "first region" can be etched and removed. In other words, the metal reflective layer can be formed only in the "second region".

This manufacturing process has advantages in light of cost and productivity from the viewpoint that the metal reflective layer can be formed with high positional accuracy while requiring no exposure processes on a photosensitive layer.

CITATION LIST

Patent Literature

PTL 1: Japanese Patent Laid-Open No. 2012-63738

SUMMARY OF INVENTION

Technical Problem

However, according to the method of PTL 1, the "metal reflective layer" can be left only in the region (the "second region") provided with the indented structure having the lower depth-to-width ratio by use of the difference in depth-to-width ratio between the indented structures in the respective regions as described above. To put it another way, it is difficult to leave the "metal reflective layer" at a portion with an indented structure having a higher depth-to-width ratio.

Meanwhile, according to the method of PTL 1, in order to provide the "metal reflective layer" on the indented structure having the high depth-to-width ratio, it is necessary to provide an indented structure having an even higher depth-to-width ratio in the "first region". Generally, a thickness of an end product needs to be increased in order to provide an indented structure having a high depth-to-width ratio. For example, when the indented structure in the "first region" with the high depth-to-width ratio is produced using an imprinting method, it is necessary to provide a mold layer with a thickness of from about five to ten times as large as a desired depth.

For this reason, when producing the indented structure having the high depth-to-width ratio, a finished laminate may have a large thickness and cause problems of a high cost and the like.

In view of the above, there is a demand for developing a novel method of manufacturing a laminate which does not rely on the difference in depth-to-width ratio between the indented structures.

An object of present invention is to provide a novel laminate in which a first layer is formed with high positional accuracy, and to provide a manufacturing method thereof.

Solution to Problem

A laminate of present invention includes: a relief structure forming layer having a principal surface including first and second regions; and a first layer provided either only in the second region or in the second region as well as in part of the first region of the relief structure forming layer. The relief structure forming layer includes the first region having an indented structure extending in a first direction or a direction tilted by an angle within 10 degrees to left or right from the first direction in a plan view, and the second region having at least one of a flat surface and an indented structure extending in a second direction orthogonal to the first direction or a direction tilted by an angle within 65 degrees to left or right from the second direction in a plan view. The first layer contains a first material different from a material of the relief structure forming layer, and has a surface shape corresponding to a surface shape of the relief structure forming layer.

A method of present invention includes the method of manufacturing a laminate including a relief structure forming layer having a principal surface including first and second regions, and a first layer provided either only in the second region or in the second region as well as in part of the first region of the relief structure forming layer. The method includes: a step (a) of forming the relief structure forming layer including the first region having an indented structure extending in a first direction or a direction tilted by an angle within 10 degrees to left or right from the first direction in a plan view, and the second region having at least one of a flat surface and an indented structure extending in a second direction orthogonal to the first direction or a direction tilted by an angle within 65 degrees to left or right from the second direction in a plan view; a step (b) of forming a first material laminate having a surface shape corresponding to a surface shape of the relief structure forming layer, by depositing a first material different from a material of the relief structure forming layer in first and second regions of the relief structure forming layer; a step (c) of locating the first material laminate in a vapor-phase deposition apparatus such that the first direction in the step (a) coincides with a direction of conveyance of the first material laminate; a step (d) of forming a second material laminate by conveying the located first material laminate and performing vapor-phase deposition of a second material different from the first material from an oblique direction onto a surface of the first material laminate on which the first material is deposited; a step (e) of forming a laminate including the first layer and a second layer in this order, the layers being provided either only in the second region or in the second region and in part of the first region of the relief structure forming layer, by exposing the second material laminate to a reactive gas or a reactive liquid being reactive with the first material; and a step (f) of removing the second layer from the laminate formed in the step (e).

A method of present invention includes the method of manufacturing a laminate including a relief structure forming layer having a principal surface including first and second regions, and a first layer and a second layer provided in this order either only in the second region or in the second region as well as in part of the first region of the relief structure forming layer. The method includes: a step (a) of forming the relief structure forming layer including the first region having an indented structure extending in a first direction or a direction tilted by an angle within 10 degrees to left or right from the first direction in a plan view, and the second region having at least one of a flat surface and an indented structure extending in a second direction orthogonal to the first direction or a direction tilted by an angle within 65 degrees to left or right from the second direction in a plan view; a step (b) of forming a first material laminate having a surface shape corresponding to a surface shape of the relief structure forming layer, by depositing a first material different from a material of the relief structure forming layer in first and second regions of the relief structure forming layer; a step (c) of locating the first material laminate in a vapor-phase deposition apparatus such that the first direction in the step (a) coincides with a direction of conveyance of the first material laminate; a step (d) of forming a second material laminate by conveying the located first material laminate and performing vapor-phase deposition of a second material different from the first material from an oblique direction onto a surface of the first material laminate on which the first material is deposited; and a step (e) of exposing the second material laminate to a reactive gas or a reactive liquid being reactive with the first material.

Advantageous Effects of Invention

The laminate of present invention includes the first layer (a functional layer) with high positional accuracy, and therefore it can be used as a component for various applications such as an optical element and an electronic circuit. Moreover, according to present invention, it is possible to provide the first layer at a desired position with high accuracy without using a difference in depth-to-width ratio of the indented structures in the respective regions.

BRIEF DESCRIPTION OF DRAWINGS

FIG. 2 includes schematic cross-sectional views sequentially showing steps of a manufacturing method of a laminate according to the first embodiment of present invention, in which FIG. 2(a) is a cross-sectional view for explaining a step of forming a relief structure forming layer, FIG. 2(b) is a cross-sectional view for explaining a step of forming a first material laminate, FIG. 2(c) is a cross-sectional view for explaining a step of locating the first material laminate in a vapor-phase deposition apparatus, FIG. 2(d) is a cross-sectional view for explaining a step of forming a second material laminate, FIG. 2(e) is a cross-sectional view for explaining a step of forming a laminate by sequentially forming a first layer and a second layer in a second region of the relief structure forming layer, and FIG. 2(f) is a cross-sectional view for explaining a step of removing the second layer;

DESCRIPTION OF EMBODIMENTS

Figure 1A:
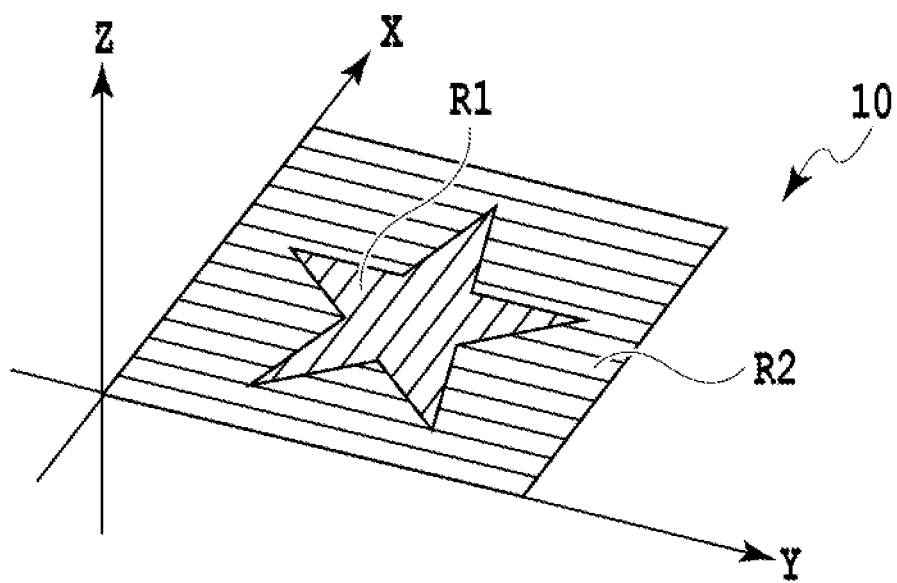
FIG. 1A is an external view schematically showing a laminate according to a first embodiment of present invention.

Embodiments of present invention will be described below in detail. While reference is made to the drawings, as appropriate, in conjunction with the following description, embodiments illustrated in the drawings represent mere examples of present invention and this invention is not limited to the embodiments illustrated in these drawings. Note that in the drawings, constituents configured to exert identical or similar functions are denoted by identical reference signs and overlapping descriptions may be omitted as appropriate. In addition, dimensional ratios in the drawings may be exaggerated for the convenience of explanation and therefore be different from actual ratios.

First Embodiment

To begin with, a first embodiment of present invention will be described.

<Laminate>

A laminate according to a first embodiment of present invention includes: a relief structure forming layer having a principal surface including first and second regions; and a first layer provided either only in the second region of the relief structure forming layer or in the second region as well as in part of the first region thereof. The relief structure forming layer includes: the first region having an indented structure extending in a first direction or a direction tilted by an angle within 10 degrees to the left or right from the first direction in a plan view; and the second region having an indented structure extending in a second direction orthogonal to the first direction or a direction tilted by an angle within 65 degrees to the left or right from the second direction, and/or a flat surface in a plan view. The first layer contains a first material which is different from a material of the relief structure forming layer, and has a surface shape corresponding to a surface shape of the relief structure forming layer.

Figure 1B:
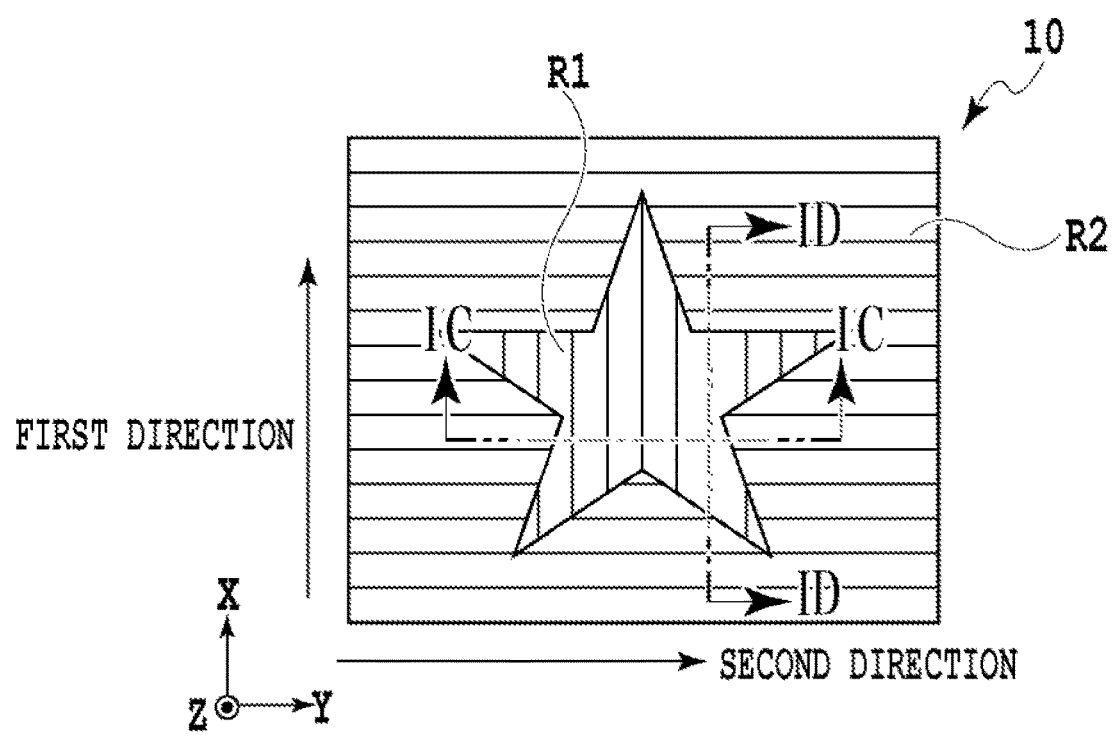
FIG. 1B is a plan view of the laminate shown in FIG. 1A.
Figure 1C:
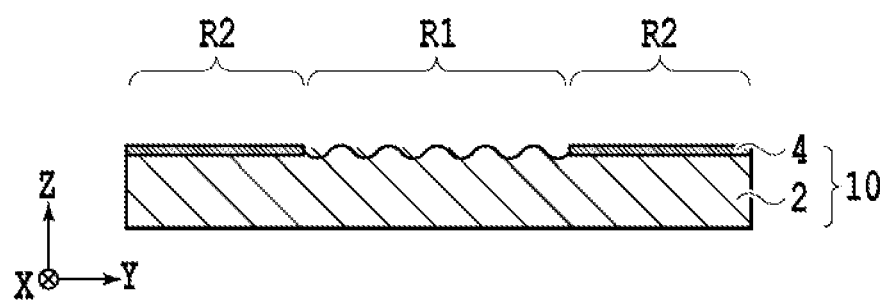
FIG. 1C is a cross-sectional view taken along the IC-IC line in FIG. 1B.
Figure 1D:
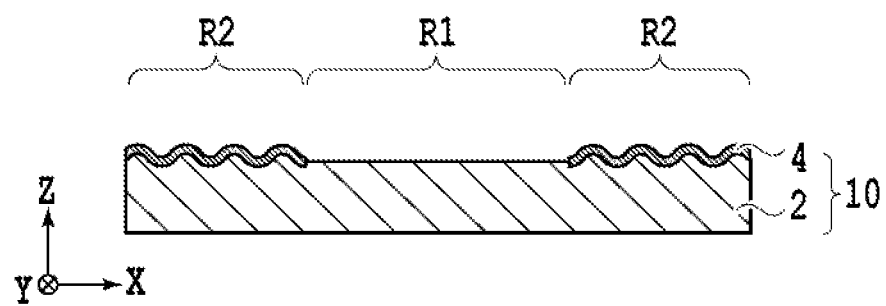
FIG. 1D is a cross-sectional view taken along the ID-ID line in FIG. 1B.

FIG. 1A is an external view schematically showing a laminate according to a first embodiment of present invention. FIG. 1B is a plan view of the laminate shown in FIG. 1A. FIG. 1C is a cross-sectional view taken along the IC-IC line in FIG. 1B. FIG. 1D is a cross-sectional view taken along the ID-ID line in FIG. 1B. In FIGS. 1A to 1D, directions that are parallel to a principal surface of the laminate and are orthogonal to each other are defined as an x direction and a y direction, respectively, while a direction perpendicular to the principal surface of the laminate is defined as a z direction.

A laminate 10 exemplarily shown in FIG. 1A includes a relief structure forming layer 2 having a principal surface that includes a first region R1 and a second region R2, and a first layer 4 provided in the second region R2 of the relief structure forming layer 2. Present invention is not limited to this. The first layer 4 may be provided in part of the first region R1 of the relief structure forming layer 2. Meanwhile, the first layer 4 does not always have to be provided in the entire second region R2 of the relief structure forming layer 2. Further, the laminate 10 of present invention may include a second layer (not shown) which covers at least the first layer 4.

Now, the relief structure forming layer 2, the first layer 4, and the second layer as an optional layer constituting the laminate 10 will be described below.

(Relief Structure Forming Layer)

The relief structure forming layer 2 includes a fine indented structure in the first region R1 and on one of its principal surfaces.

In the example of the laminate 10 shown in FIG. 1A, the indented structure extends in the first direction in the first region R1 as shown in FIG. 1B. In the laminate 10 of present invention, the indented structure may extend in the first region R1 not only in the first direction but also in a direction tilted by an angle within 10 degrees to the left or right from the first direction. The first direction typically coincides with a direction of conveyance of a first material laminate 20 as defined in a step (c) in a manufacturing method of the laminate 10 of present invention to be described later.

Alternatively, the indented structure may extend in the first region R1 not only in one direction but also in two or more directions as long as each of the directions of extension is either the first direction or a direction tilted by an angle within 10 degrees to the left or right from the first direction. Meanwhile, the indented structure may have a cross-grating structure (a lattice structure) in a plan view. The indented structure may extend discontinuously.

In this specification, an expression "α degrees to the left or right" for defining directions of extension of the indented structure may be indicated as "±α degrees". Meanwhile, an expression "α degrees to the right" may be indicated as "+a degrees" or "α degrees", and an expression "α degrees to the left" may be indicated as "−α degrees" as appropriate. Moreover, a certain direction of extension and a direction of extension obtained by adding 180 degrees to the certain direction of extension are deemed to be identical to each other.

The indented structure provided in the first region R1 is formed from a recessed structure and/or a projecting structure, or more typically from multiple recessed structures and/or multiple projecting structures. Pitches of such multiple recessed portions and/or multiple projecting portions may be either constant or not constant. In this specification, the "pitch" of the recessed portions and the "pitch" of the projecting portions mean a center-to-center distance of two recessed portions adjacent to each other and a center-to-center distance of two projecting portions adjacent to each other, respectively. FIG. 1C shows an example of providing multiple recessed portions (grooves) arranged at a constant pitch. These multiple recessed portions typically constitute a diffraction structure that emits diffracted light when illuminated with white light. In the laminate 10 of present invention, the pitches of the recessed portions or the projecting portions in the first region R1 may be set in a range from 0.1 µm to 3.0 µm, for example.

A cross section perpendicular to the direction of extension of the indented structure can take the form of a V-shape, a U-shape (a sinusoidal curve shape), a tapered shape such as a trapezoidal shape, or a rectangular shape, for instance. As an example, FIG. 1C depicts the case where the cross-sectional shape is the U-shape.

A depth of each recessed portion or a height of each projecting portion can be set in a range from 0.02 µm to 1.5 µm, for example.

An average value of a ratio of either the depth of the recessed portion or the height of the projecting portion to the pitch thereof (hereinafter also simply referred to as an "aspect ratio") can be set equal to or below 3.0 or typically in a range from 1.0 to 0.15.

While the indented structure provided in the first region R1 has been described above with reference to FIGS. 1B and 1C, present invention also encompasses structures shown in FIGS. 9A to 11B as the indented structures to be provided in the first region R1.

Figure 9A:
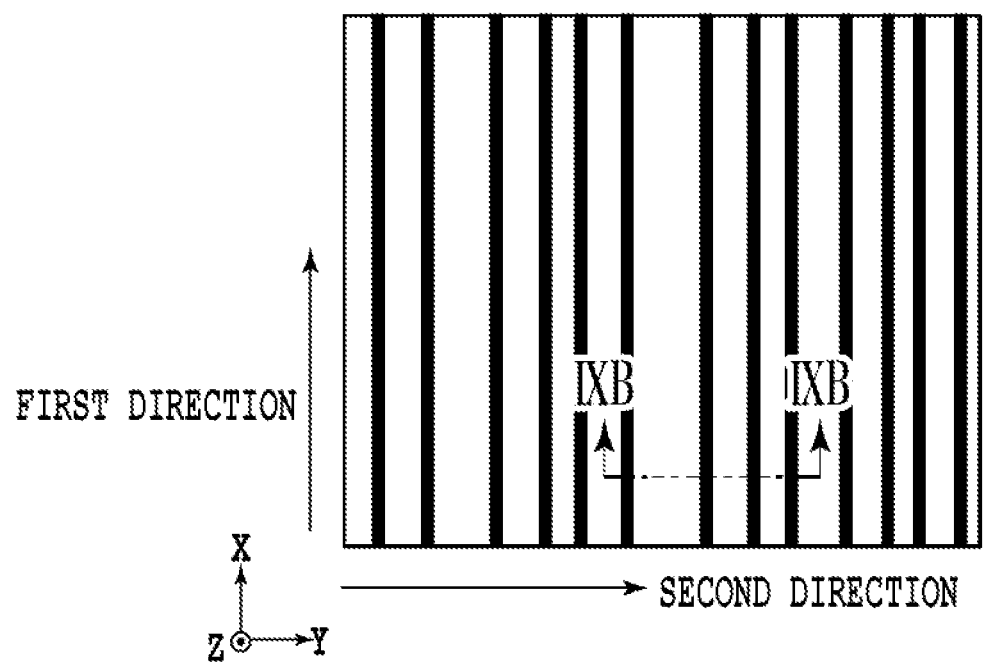
FIG. 9A is a plan view schematically showing a structure in which multiple straight recessed portions extend in a first direction and pitches of the recessed portions are not constant.
Figure 9B:
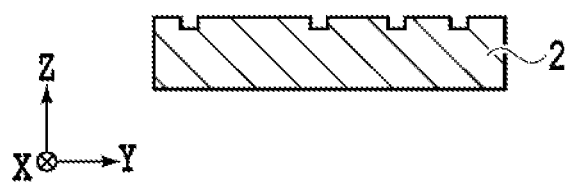
FIG. 9B is a cross-sectional view taken along the IXB-IXB line in FIG. 9A.

FIG. 9A is a plan view schematically showing a structure in which multiple straight recessed portions (grooves) extend in the first direction and pitches of the recessed portions are not constant, and FIG. 9B is a cross-sectional view taken along the IXB-IXB line in FIG. 9A. In order to facilitate the understanding of the indented structure, the recessed portions (the grooves) are blackened in FIG. 9A.

The pitches in the structure including the recessed portions with the non-constant pitches as shown in FIG. 9A are not limited to particular pitches. For example, the pitches can vary in a range from 0.1 to 3.0 µm or preferably in a range from 0.4 to 0.7 µm.

A distance between two adjacent recessed portions is preferably set in a range from 0.1 to 10 times as large as the width of each recessed portion.

The depth of each recessed portion can be set in a range from 0.02 to 1.5 µm, for example.

The average values of the ratio of the depth of the recessed portion to the pitch thereof can be set equal to or below 3.0 or typically in a range from 1.0 to 0.15.

Figure 10A:
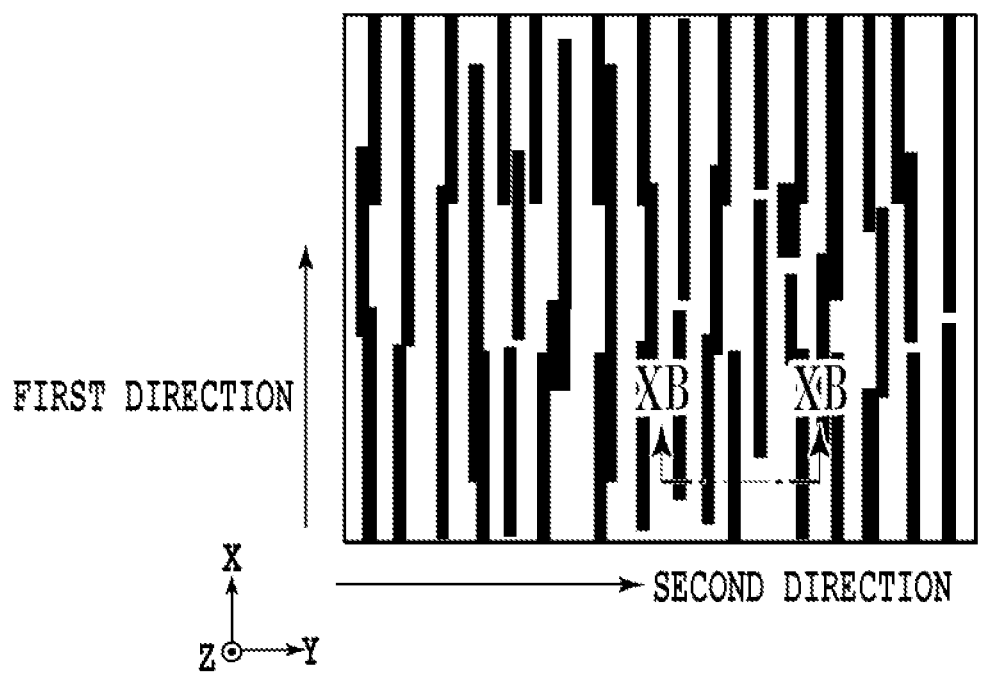
FIG. 10A is a plan view schematically showing a structure in which recessed portions extending in the first direction are arranged at random.
Figure 10B:
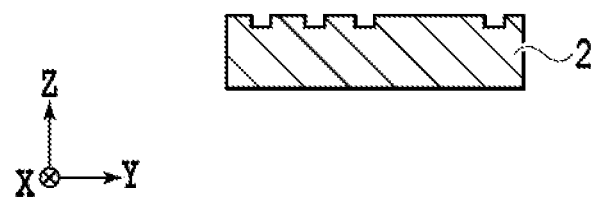
FIG. 10B is a cross-sectional view taken along the XB-XB line in FIG. 10A.

FIG. 10A is a plan view schematically showing a structure in which the recessed portions (the grooves) extending in the first direction are arranged at random, and FIG. 10B is a cross-sectional view taken along the XB-XB line in FIG. 10A. In order to facilitate the understanding of the indented structure, the recessed portions (the grooves) are blackened in FIG. 10A.

As shown at a right end in FIG. 10A, the shape of each recessed portion is typically rectangular in a plan view, of which long sides and short sides extend along the first direction and the second direction, respectively. A ratio of the long side to the short side is preferably equal to or above 2.

As shown in FIG. 10A, some rectangular recessed portions may be partially combined with one another in a plan view so as to collectively form a polygonal recessed portion in a plan view. In this case, in terms of a contour of such a polygon, a sum of lengths of sides along the first direction is preferably set twice or more as much as a sum of lengths of sides along the second direction. Here, the contour of the polygon means a contour of the recessed portion formed by cutting the recessed portion out along an X-Y plane at its average depth.

Figure 11A:
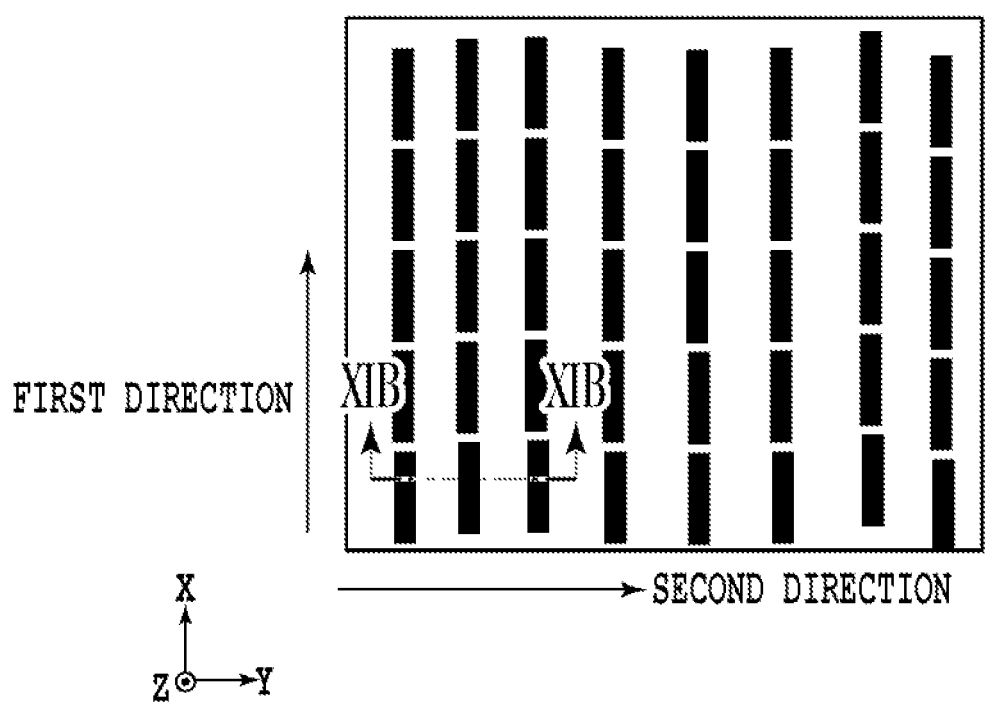
FIG. 11A is a plan view schematically showing a structure in which multiple straight recessed portions extend discontinuously in the first direction.
Figure 11B:
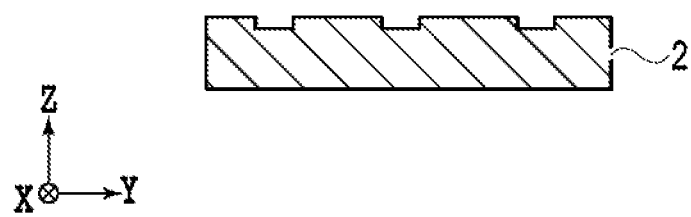
FIG. 11B is a cross-sectional view taken along the XIB-XIB line in FIG. 11A.

FIG. 11A is a plan view schematically showing a structure in which the straight recessed portions (the grooves) extend discontinuously (intermittently) in the first direction, and FIG. 11B is a cross-sectional view taken along the XIB-XIB line in FIG. 11A. In order to facilitate the understanding of the indented structure, the recessed portions (the grooves) are blackened in FIG. 11A.

In this structure, the pitches of the recessed portions in the second direction are set in a range from 0.1 to 3.0 µm or preferably in a range from 0.4 to 0.7 µm, which may be either constant or not constant.

As shown in FIG. 11A, the shape of each recessed portion is typically rectangular in a plan view, of which long sides and short sides extend along the first direction and the second direction, respectively. A ratio of the long side to the short side is preferably equal to or above 2.

Meanwhile, it is preferable that an interval between two of the recessed portions in the first direction be sufficiently smaller than the width (the short side of the rectangle) of each recessed portion, which is defined to be equal to or below ½, for example. While a lower limit of the interval between the recessed portions is not limited to a particular value, the lower limit may be set equal to or above ¹⁄₁₀ in view of the ease of manufacture.

The depth of each recessed portion can be set in a range from 0.02 to 1.5 µm, for example.

The average values of the ratio of the depth of the recessed portion to the pitch thereof can be set equal to or below 3.0 or typically in a range from 1.0 to 0.15.

In the above explanation made with reference to FIGS. 9A to 11B, the direction of extension of the recessed portions is defined as the first direction. However, present invention is not limited to this, and each recessed portion may extend in a direction tilted by an angle within 10 degrees to the left or right from the first direction. In addition, the above description of the recessed portions can replace the description of the projecting portions.

The relief structure forming layer 2 includes a fine indented structure and/or a flat surface in the second region R2 to be provided on the one principal surface thereof.

In the example of the laminate 10 shown in FIG. 1B, the indented structure extends in the second direction, which is orthogonal to the first direction, in the second region R2. In the laminate 10 of present invention, the indented structure may extend in the second region R2 not only in the second direction but also in a direction tilted by an angle within 65 degrees to the left or right from the second direction.

Alternatively, the indented structure may extend in the second region R2 not only in one direction but also in two or more directions as long as each of the directions of extension is either the second direction or a direction tilted by an angle within 65 degrees to the left or right from the second direction. Meanwhile, the indented structure may have a cross-grating structure (a lattice structure) in a plan view. In the meantime, the indented structure may extend discontinuously.

The indented structure provided in the second region R2 is formed from a recessed structure and/or a projecting structure, or more typically from multiple recessed structures and/or multiple projecting structures. Pitches of such multiple recessed portions and/or multiple projecting portions may be either constant or not constant. FIG. 1D shows an example of providing multiple recessed portions arranged at a constant pitch. These multiple recessed portions typically constitute a diffraction structure that emits diffracted light when illuminated with white light. The pitches of the recessed portions or the projecting portions in the second region R2 may be set in a range from 0.1 µm to 3.0 µm, for example.

A cross section perpendicular to the direction of extension of the indented structure can take the form of a V-shape, a U-shape (a sinusoidal curve shape), a tapered shape such as a trapezoidal shape, or a rectangular shape, for instance. As an example, FIG. 1D depicts the case where the cross-sectional shape is the U-shape.

A depth of each recessed portion or a height of each projecting portion can be set in a range from 0.02 µm to 1.5 µm, for example.

An aspect ratio of the indented structure provided in the second region R2 can be set preferably equal to or below 1.0, more preferably equal to or below 0.8, or even more preferably equal to or below 0.5. Moreover, this aspect ratio can also be set no more than twice as large as the aspect ratio of the indented structure provided in the first region R1.

While the indented structure provided in the second region R2 has been described above with reference to FIGS. 1B and 1D, present invention also encompasses structures shown in FIGS. 12A to 14B as indented structures to be provided in the second region R2.

Figure 12A:
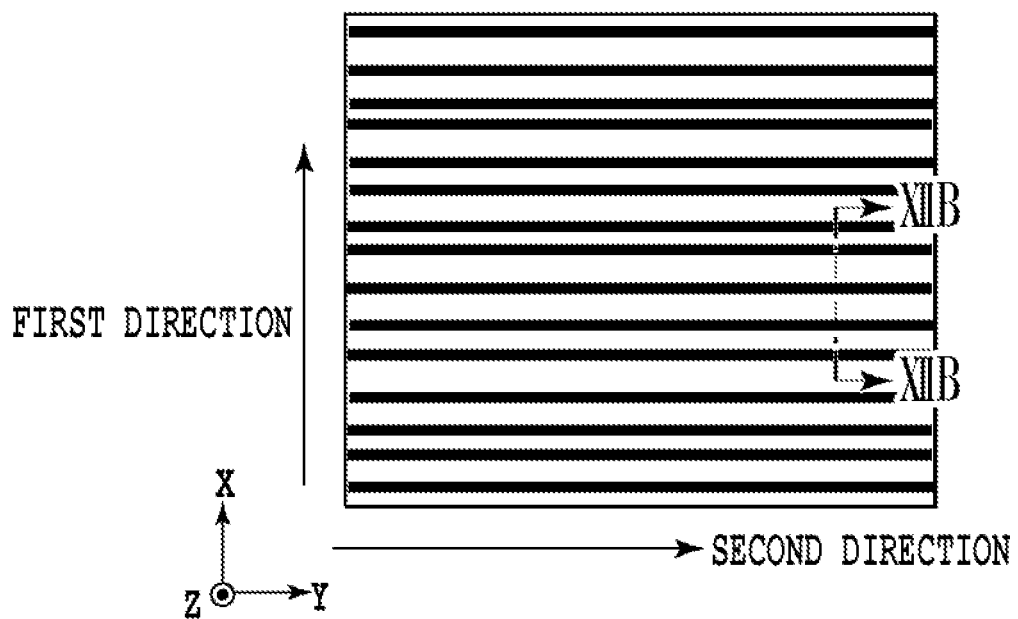
FIG. 12A is a plan view schematically showing a structure in which multiple straight recessed portions extend in a second direction and pitches of the recessed portions are not constant.
Figure 12B:
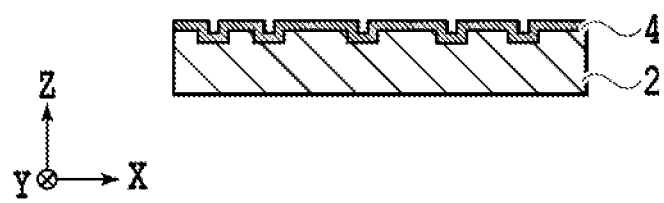
FIG. 12B is a cross-sectional view taken along the XIIB-XIIB line in FIG. 12A.

FIG. 12A is a plan view schematically showing a structure in which multiple straight recessed portions (grooves) extend in the second direction and pitches of the recessed portions are not constant, and FIG. 12B is a cross-sectional view taken along the XIIB-XIIB line in FIG. 12A. In order to facilitate the understanding of the indented structure, the recessed portions (the grooves) are blackened in FIG. 12A.

The pitches in the structure including the recessed portions with the non-constant pitches as shown in FIGS. 12A and 12B are not limited to particularly pitches. For example, the pitches can vary in a range from 0.1 to 3.0 µm or preferably in a range from 0.4 to 0.7 µm.

The depth of each recessed portion can be set in a range from 0.02 to 1.5 µm, for example.

The average values of the ratio of the depth of the recessed portion to the pitch thereof can be set equal to or below 3.0 or typically in a range from 1.0 to 0.15.

Figure 13A:
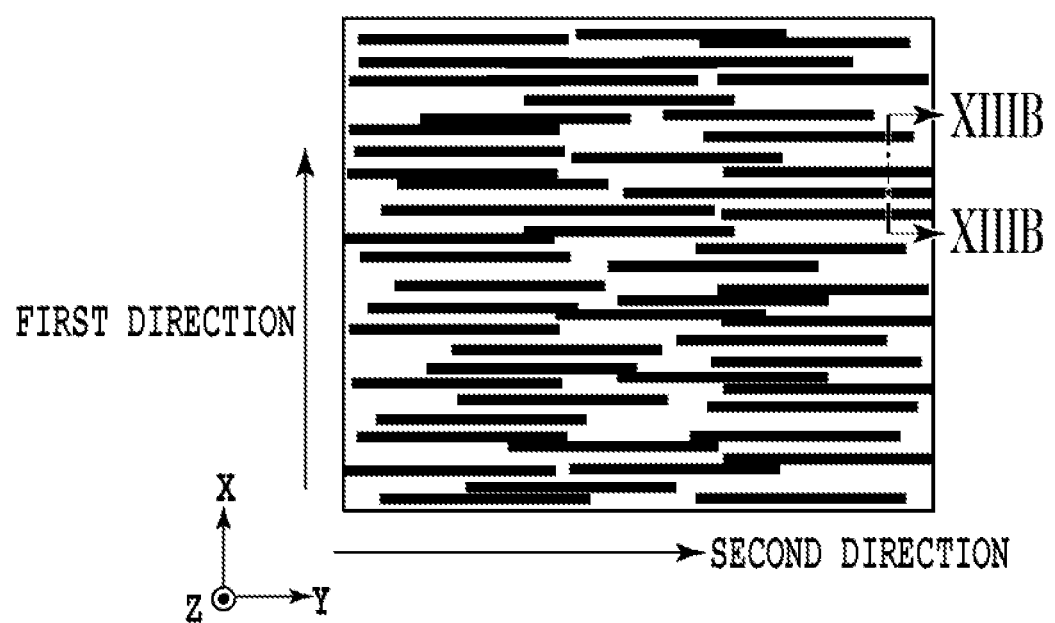
FIG. 13A is a plan view schematically showing a structure in which recessed portions extending in the second direction are arranged at random.
Figure 13B:
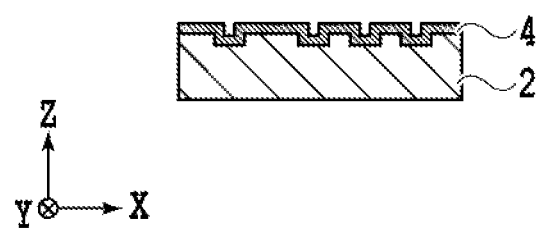
FIG. 13B is a cross-sectional view taken along the XIIIB-XIIIB line in FIG. 13A.

FIG. 13A is a plan view schematically showing a structure in which the recessed portions (the grooves) extending in the second direction are arranged at random, and FIG. 13B is a cross-sectional view taken along the XIIIB-XIIIB line in FIG. 13A. In order to facilitate the understanding of the indented structure, the recessed portions (the grooves) are blackened in FIG. 13A.

As shown at a lower end in FIG. 13A, the shape of each recessed portion is typically rectangular in a plan view, of which short sides and long sides extend along the first direction and the second direction, respectively. A ratio of the long side to the short side is preferably equal to or above 1.5.

As shown in FIG. 13A, some rectangular recessed portions may be partially combined with one another in a plan view so as to collectively form a polygonal recessed portion in a plan view. In this case, in terms of a contour of such a polygon, a sum of lengths of sides along the first direction is preferably set 1.5 times or more as much as a sum of lengths of sides along the second direction. Here, the contour of the polygon means a contour of the recessed portion formed by cutting the recessed portion out along an X-Y plane at its average depth.

Figure 14A:
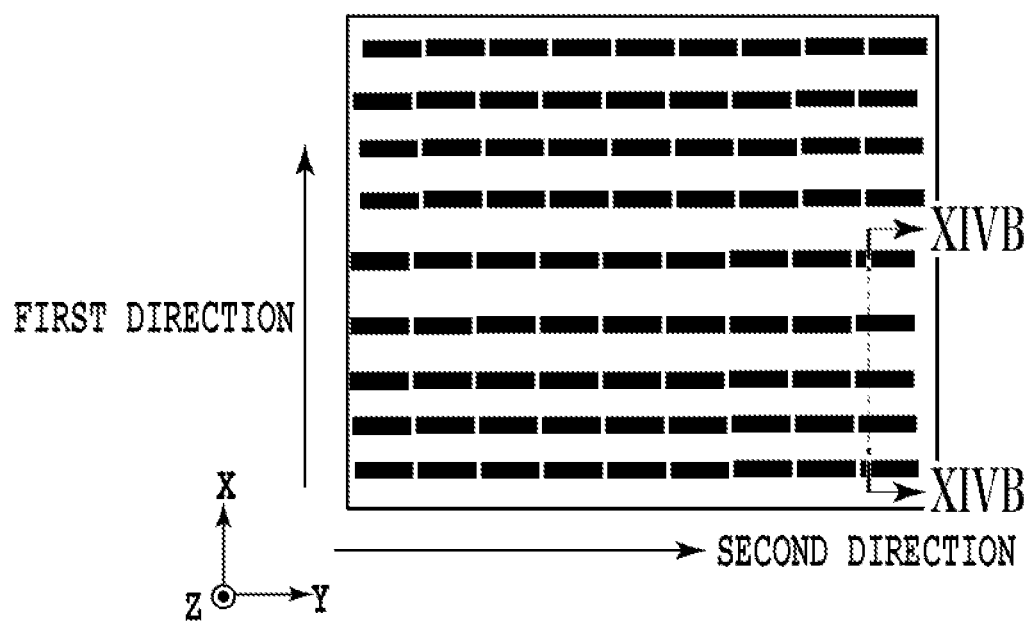
FIG. 14A is a plan view schematically showing a structure in which multiple straight recessed portions extend discontinuously in the second direction.
Figure 14B:
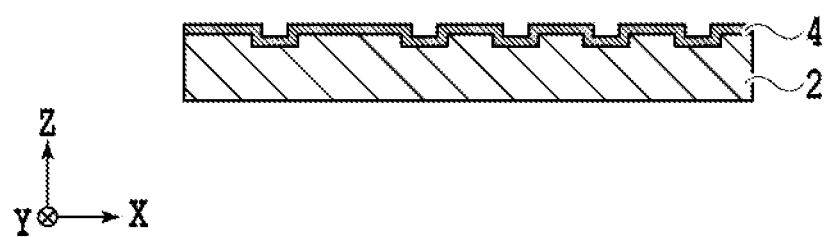
FIG. 14B is a cross-sectional view taken along the XIVB-XIVB line in FIG. 14A.

FIG. 14A is a plan view schematically showing a structure in which the straight recessed portions (the grooves) extend discontinuously (intermittently) in the second direction, and FIG. 14B is a cross-sectional view taken along the XIVB-XIVB line in FIG. 14A. In order to facilitate the understanding of the indented structure, the recessed portions (the grooves) are blackened in FIG. 14A.

In this structure, the pitches of the recessed portions in the first direction are set in a range from 0.1 to 3.0 µm or preferably in a range from 0.4 to 0.7 µm, which may be either constant or not constant.

The depth of each recessed portion can be set in a range from 0.02 to 1.5 µm, for example.

The average values of the ratio of the depth of the recessed portion to the pitch thereof can be set equal to or below 3.0 or typically in a range from 1.0 to 0.15.

As shown in FIG. 14A, the shape of each recessed portion is typically rectangular in a plan view, of which short sides and long sides extend along the first direction and the second direction, respectively. A ratio of the long side to the short side is preferably equal to or above 1.5.

In the above explanation made with reference to FIGS. 12A to 14B, the direction of extension of the recessed portions is defined as the second direction. However, present invention is not limited to this, and each recessed portion may extend in a direction tilted by an angle within 65 degrees to the left or right from the second direction. In addition, the above description of the recessed portions can replace the description of the projecting portions.

Furthermore, the relief structure forming layer 2 may include any of flat surfaces described below, which are provided in the second region R2.

FIGS. 15A to 17B are schematic diagrams showing modified examples of flat surfaces to be provided in the second region R2. The recessed portions are blackened in FIGS. 15A, 16A, and 17A.

Figure 15A:
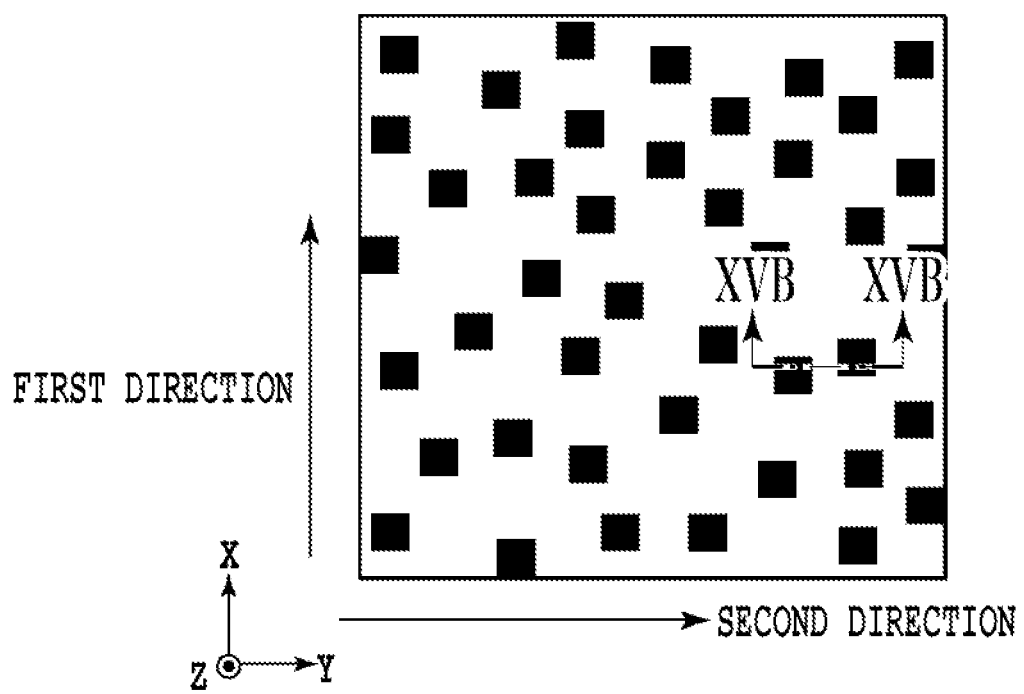
FIG. 15A is a plan view schematically showing a flat surface including recessed portions.
Figure 15B:
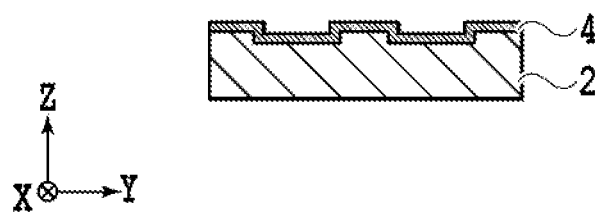
FIG. 15B is a cross-sectional view taken along the XVB-XVB line in FIG. 15A.

FIG. 15A is a plan view schematically showing a flat surface including recessed portions, and FIG. 15B is a cross-sectional view taken along the XVB-XVB line in FIG. 15A. In this example, an outer shape of each recessed portion is a square in a plan view as shown in FIG. 15A. However, present invention is not limited to this configuration, and a rectangle, a circle, and the like are also included, for instance. When the outer shape of each recessed portion is a rectangle, a ratio of length of a side along the first direction to a side along the second direction is preferably set in a range from 0.66 to 1.5.

Although the pitches of the adjacent recessed portions are not constant in the example of FIG. 15A, the pitches may be constant instead. The pitches of the adjacent recessed portions are preferably equal to or above 0.2 µm.

A depth of each recessed portion can be set in a range from 0.1 to 5 µm, for example. These depths may be either constant or not constant.

An average value of a ratio of the depth of the recessed portion to the pitch thereof can be set equal to or below 1.0 or typically equal to or below 0.5.

Figure 16A:
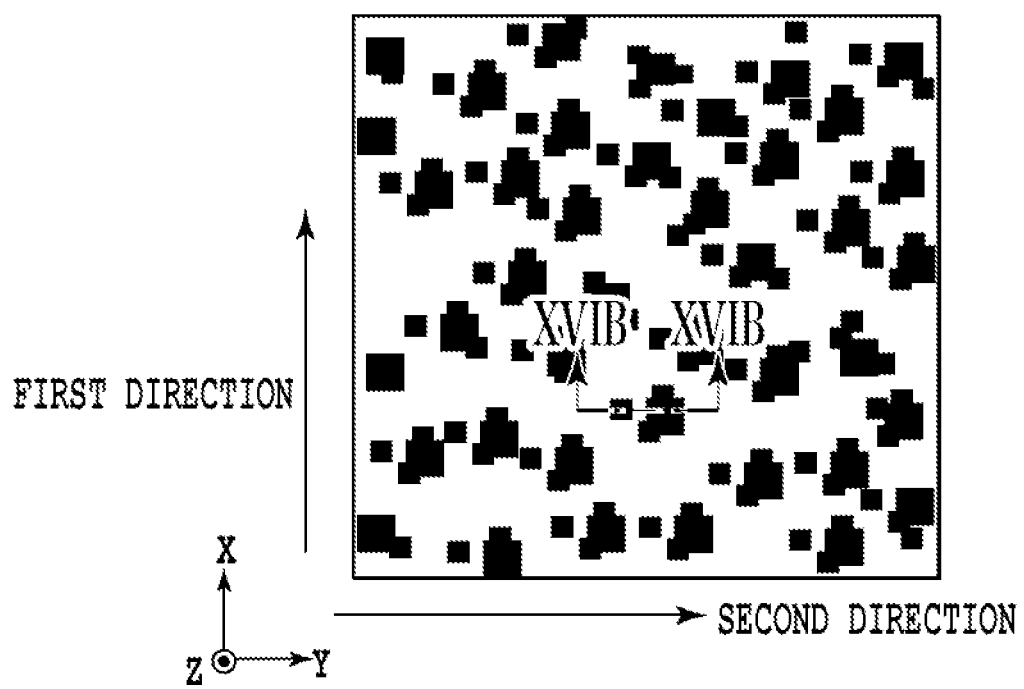
FIG. 16A is a plan view schematically showing a flat surface including combination of two types of recessed portions.
Figure 16B:
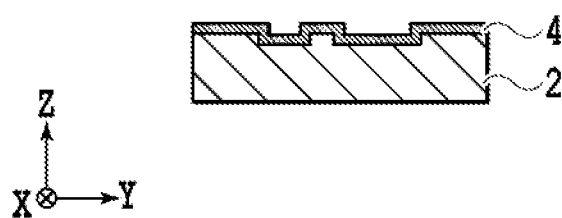
FIG. 16B is a cross-sectional view taken along the XVIB-XVIB line in FIG. 16A.

FIG. 16A is a plan view schematically showing a flat surface including combination of two types of recessed portions, and FIG. 16B is a cross-sectional view taken along the XVIB-XVIB line in FIG. 16A.

In this example, an outer shape of the bottom surface of each recessed portion is formed of two types of squares in different sizes as shown in FIG. 16A, and polygons are formed in part with the two types of squares overlapping one another. In present invention, the outer shape of the bottom surface of each recessed portion may also be formed of combination of multiple types of squares, rectangles, and circles in difference sizes.

When a polygon is formed by partial overlapping, in terms of a contour of such a polygon, a sum of lengths of sides along the first direction is set preferably from 0.66 to 1.5 times, or more preferably one time as much as a sum of lengths of sides along the second direction. Here, the contour of the polygon means a contour of the recessed portion formed by cutting the recessed portion out along an X-Y plane at its average depth.

In the meantime, it is difficult to measure the lengths of the sides along the first direction and the second direction when the contour of the polygon is formed into a rounded shape or the like. In this case, a section surrounded by the contour of each recessed portion may be paved with squares each having the area equivalent to a one-hundredth of the area of this section, so that each of the sums of the lengths of the sides along the first direction and the second direction may be calculated approximately.

Figure 17A:
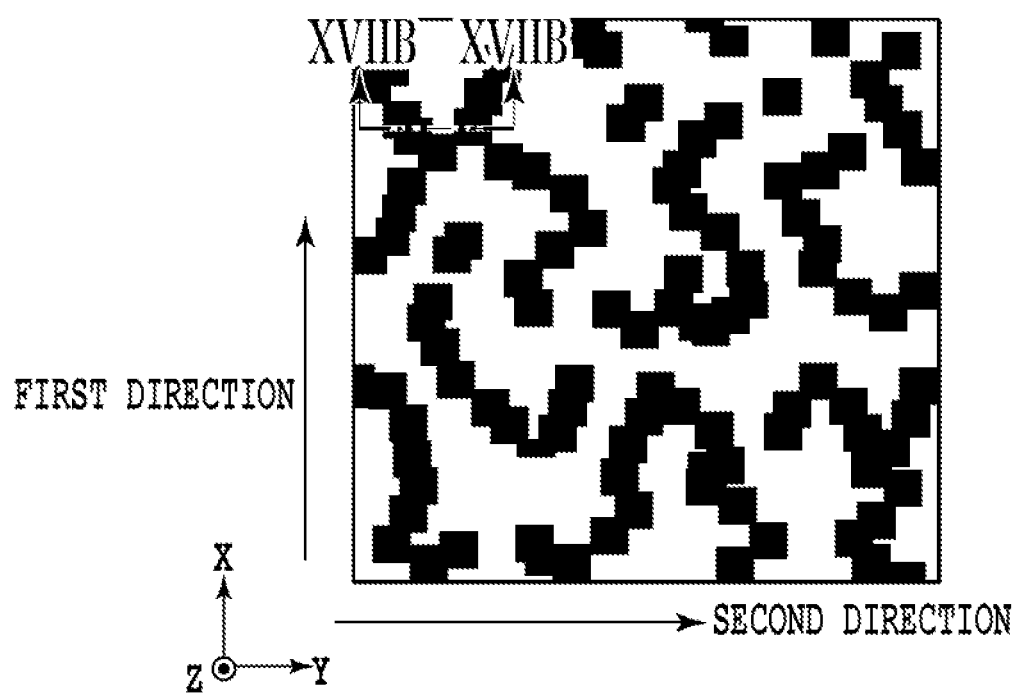
FIG. 17A is a plan view showing a modified example of FIG. 15A.
Figure 17B:
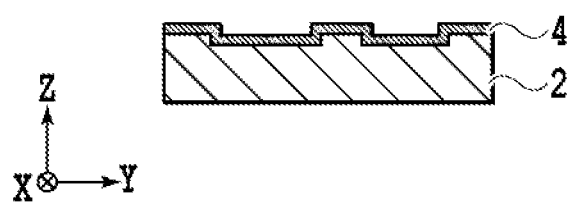
FIG. 17B is a cross-sectional view taken along the XVIIB-XVIIB line in FIG. 17A.

FIG. 17A is a plan view showing a modified example of FIG. 15A, and FIG. 17B is a cross-sectional view taken along the XVIIB-XVIIB line in FIG. 17A.

In the example shown in FIG. 15A, the recessed portions each having the square outer shape of the bottom surface do not overlap one another. On the other hand, in the example shown in FIG. 17A, the recessed portions partially overlap one another to form polygons. In present invention, the outer shape of the bottom surfaces of the respective recessed portions may include not only squares but also rectangles, and circles.

When a polygon is formed by partial overlapping, in terms of a contour of such a polygon, a sum of lengths of sides along the first direction is set preferably from 0.66 to 1.5 times, or more preferably one time as much as a sum of lengths of sides along the second direction. Here, the contour of the polygon means a contour of the recessed portion formed by cutting the recessed portion out along an X-Y plane at its average depth. In the meantime, if the contour of the polygon is formed into a rounded shape, a section surrounded by the contour may be paved with squares each having the area equivalent to a one-hundredth of the area of this section, so that a ratio of the sum of the lengths of the sides along the first direction to the sum of the lengths of the sides along the second direction may be calculated approximately.

In the above explanation made with reference to FIGS. 15A to 17B, the description of the recessed portions can replace the description of the projecting portions.

A film thickness of the relief structure forming layer 2 can be set equal to or below 3.0 µm. In this specification, the "film thickness" of a layer means an average value of distances each between a point on one of surfaces of the layer and a foot of a perpendicular extending toward the other surface of the layer.

Materials and the like of the relief structure forming layer 2 will be explained in detail in the section <Manufacturing Method of Laminate> to be described later.

(First Layer)

Though the first layer 4 is the layer provided on the relief structure forming layer 2, this layer is not provided on the entire surface of the relief structure forming layer 2 but is provided either only in the second region R2 or in the second region R2 and in part of the first region R1. In the example of the laminate 10 shown in FIG. 1A, the first layer 4 is provided only in the second region R2 as shown in FIGS. 1C and 1D.

As shown in FIGS. 1C and 1D, the first layer 4 has a shape that corresponds to a surface shape of the relief structure forming layer 2.

The first layer 4 may take the form of various layers depending on the usage of the laminate 10. For instance, when the laminate 10 is used as an optical element, the first layer 4 may be a reflective layer. When using the laminate 10 as an electronic circuit, the first layer 4 may be a conductive layer.

A film thickness of the first layer 4 may vary depending on the indented structure of the relief structure forming layer 2, the usage of the laminate 10, and the like. For instance, when the laminate 10 is used as an optical element and the first layer 4 is a reflective layer, the film thickness can be selected as appropriate while taking into account a relief structure, reflectance, an optical effect, and the like. When such a reflective layer is formed by use of aluminum, the film thickness of the first layer 4 can be set in a range from about 20 nm to 200 nm.

When the laminate 10 is used as an electronic circuit and the first layer 4 is a circuit conductive layer, the film thickness may be selected as appropriate while taking into account a resistance value and the like. When such a circuit conductive layer is formed by use of aluminum, the film thickness can be set in a range from about 40 nm to 300 nm.

Materials and the like of the first layer 4 will be explained in detail in the section <Manufacturing Method of Laminate> to be described later.

(Second Layer)

The laminate 10 of present invention may include the second layer. In this case, the second layer is provided in such a way as to cover at least the first layer 4. The second layer may or may not have such a surface shape that corresponds to the surface shape of the relief structure forming layer 2.

A film thickness of the second layer may vary depending on the usage of the laminate 10. For instance, when the laminate 10 is used as an optical element, the film thickness may be set in a range from about 10 nm to 300 nm. When the laminate 10 is used as an electronic circuit, the film thickness may be set in a range from about 10 nm to 300 nm.

Materials and the like of the second layer will be explained in detail in the section <Manufacturing Method of Laminate> to be described later.

The above-described laminate 10 includes the first layer 4 with high positional accuracy. For this reason, the laminate 10 can be used, for example, as a component for an optical element, an electronic circuit, and the like.

<Manufacturing Method of Laminate>

Next, a manufacturing method of a laminate according to the first embodiment of present invention will be described.

The manufacturing method of a laminate according to the first embodiment of present invention includes: a step (a) of forming a relief structure forming layer including a first region including an indented structure extending in a first direction or a direction tilted by an angle within 10 degrees to the left or right from the first direction in a plan view, and a second region including an indented structure extending in a second direction orthogonal to the first direction or a direction tilted by an angle within 65 degrees to the left or right from the second direction, and/or a flat surface in a plan view; a step (b) of forming a first material laminate having a surface shape corresponding to a surface shape of the relief structure forming layer, by depositing a first material being different from a material of the relief structure forming layer in first and second regions of the relief structure forming layer; a step (c) of locating the first material laminate in a vapor-phase deposition apparatus such that the first direction mentioned in the step (a) coincides with a direction of conveyance of the first material laminate; a step (d) of forming a second material laminate by conveying the located first material laminate and performing vapor-phase deposition of a second material different from the first material from an oblique direction onto a surface of the first material laminate on which the first material is deposited; a step (e) of forming a laminate including a first layer and a second layer in this order, the layers being provided either only in the second region or in the second region and in part of the first region of the relief structure forming layer, by exposing the second material laminate to a reactive gas or a reactive liquid which is reactive with the first material; and a step (f) of removing the second layer from the laminate formed in the step (e).

The manufacturing method of a laminate according to the first embodiment of present invention will be described below with reference to FIGS. 2(a) to 2(f).

FIGS. 2(a) to 2(f) are schematic cross-sectional views sequentially showing the respective steps of the manufacturing method of the laminate shown in FIG. 1A, in which FIG. 2(a) is a cross-sectional view for explaining a step of forming the relief structure forming layer 2, FIG. 2(b) is a cross-sectional view for explaining a step of forming a first material laminate 20, FIG. 2(c) is a cross-sectional view for explaining a step of locating the first material laminate 20, FIG. 2(d) is a cross-sectional view for explaining a step of forming a second material laminate 30, FIG. 2(e) is a cross-sectional view for explaining a step of forming a laminate 40 by sequentially forming a first layer 4' and a second layer 6 in the second region R2 of the relief structure forming layer 2, and FIG. 2(f) is a cross-sectional view for explaining a step of removing the second layer 6 from the laminate 40 shown in FIG. 2(e). Here, FIG. 2(f) corresponds to FIG. 1D.

(Step (a))

First, the relief structure forming layer 2 having the principal surface including the first region R1 and the second region R2 is formed as shown in FIG. 2(a).

In the first region R1, the relief structure forming layer 2 includes the indented structure extending in the first direction or the direction tilted by an angle within 10 degrees to the left or right from the first direction in a plan view. Moreover, in the second region, the relief structure forming layer 2 includes the indented structure extending in the second direction orthogonal to the first direction or a direction tilted by an angle within 65 degrees to the left or right from the second direction, and/or a flat surface in a plan view. The details of the indented structures in the first region R1 and the second region R2 have been described above in the subsection (Relief Structure Forming Layer) of the section <Laminate>.

The relief structure forming layer 2 can be formed by pressing a mold including fine projecting portions against a resin, for example. Shapes of such projecting portions correspond to the shapes of the recessed portions to be provided in the first region R1 and/or the second region R2.

The relief structure forming layer 2 may be formed with a method of coating a thermoplastic resin on a base material and pressing an original plate (a mold) including the aforementioned projecting portions against the resin while applying heat thereto. Examples of the thermoplastic resin usable herein include acrylic-based resins, epoxy-based resins, cellulose-based resins, vinyl-based resins, and mixtures or copolymers thereof.

Alternatively, the relief structure forming layer 2 may be formed with a method of coating a thermosetting resin on a base material, applying heat thereto while pressing an original plate including the aforementioned projecting portions against the resin, and then removing the original plate. Examples of the thermosetting resin usable in this case include urethane resins, melamine-based resins, epoxy resins, phenol-based resins, and mixtures or copolymers thereof. Such a urethane resin can be obtained, for example, by adding polyisocyanate as a cross-linker to any of acrylic polyol and polyester polyol containing a reactive hydroxyl group, thereby cross-linking these materials.

Alternatively, the relief structure forming layer 2 may be formed with a method of coating a radiation curable resin on a base material, curing the resin by irradiating the resin with radiation such as ultraviolet rays while pressing an original plate against the resin, and then removing the original plate. Alternatively, the relief structure forming layer 2 may be formed with a method of feeding the resin to a space between the base material and the original plate, curing the resin by irradiating the resin with the radiation, and then removing the original plate.

Such a radiation curable resin typically contains a polymerizable compound and an initiator.

For instance, a photo-radical polymerizable compound can be used as the polymerizable compound. Any of a monomer, an oligomer, and a polymer containing an ethylenically unsaturated bond or an ethylenically unsaturated group can be used as the photo-radical polymerizable compound. Examples of the photo-radical polymerizable compound usable herein include: monomers such as 1,6-hexanediol, neopentyl glycol diacrylate, trimethylol propane triacrylate, pentaerythritol triacrylate, pentaerythritol tetraacrylate, pentaerythritol pentaacrylate, and dipentaerythritol hexaacrylate; oligomers such as epoxy acrylate, urethane acrylate, and polyester acrylate; and polymers such as urethane-modified acrylic resins and epoxy-modified acrylic resins.

When using the photo-radial polymerizable compound as the polymerizable compound, a photo-radial polymerization initiator can be used as the initiator. Examples of the photo-radial polymerization initiator usable herein include: benzoin-based compounds such as benzoin, benzoin methyl ether, and benzoin ethyl ether; anthraquinone-based compounds such as anthraquinone and methyl anthraquinone; phenylketone-based compounds such as acetophenone, diethoxyacetophenone, benzophenone, hydroxyacetophenone, 1-hydroxycyclohexyl phenyl ketone, α-aminoacetophenone, and 2-methyl-1-(4-methylthio phenyl)-2-morpholino propan-1-one; benzyl dimethyl ketal; thioxanthone; acyl phosphine oxide; and Michler's ketone.

Alternatively, a photo-cationic polymerizable compound can be used as the polymerizable compound. Any of: a monomer, an oligomer, and a polymer containing an epoxy group; an oxetane backbone-containing compound; and a vinyl ether can be used as the photo-cationic polymerizable compound, for example.

When using the photo-cationic polymerizable compound as the polymerizable compound, a photo-cationic polymerization initiator can be used as the initiator. Examples of the photo-cationic polymerization initiator usable herein include aromatic diazonium salts, aromatic iodonium salts, aromatic sulfonium salts, aromatic phosphonium salts, and metal salts of mixed ligands.

Alternatively, a mixture of the photo-radical polymerizable compound and the photo-cationic polymerizable compound can be used as the polymerizable compound. In this case, a mixture of the photo-radial polymerization initiator and the photo-cationic polymerization initiator can be used as the initiator. Alternatively, a polymerization initiator that can function as an initiator for both the photo-radical polymerization and the photo-cationic polymerization may be used in this case. Examples of such an initiator usable herein include the aromatic iodonium salts and the aromatic sulfonium salts.

A proportion of the initiator to the radiation curable resin can be set in a range from 0.1% by mass to 15% by mass, for example.

The radiation curable resin may further contain a sensitizing dye, a dye, a pigment, a polymerization inhibitor, a leveling agent, an antifoaming agent, an antisagging agent, an adhesion improver, a coating surface modifier, a plasticizer, a nitrogen-containing compound, a cross-linker such as an epoxy resin, and a release agent, or a combination thereof. To improve the moldability of the radiation curable resin, the resin may further contain a non-reactive resin. Examples of the non-reactive resin usable herein include the thermoplastic resins and/or the thermosetting resins mentioned above.

The above-mentioned original plate used for forming the relief structure forming layer 2 can be manufactured by use of an electron beam drawing apparatus or a nanoimprinting apparatus, for example. In this way, it is possible to form the above-mentioned multiple recessed portions or projecting portions with high accuracy. In present invention, the indented structure to be provided on the relief structure forming layer 2 may be a structure obtained by repeatedly imposing a unit structure with its area in a range from 4 µm$^2$ to 10000 µm$^2$. In this case, an amount of data used for the drawing can be significantly reduced since a pattern to form the unit structure can be used repeatedly.

The relief structure forming layer 2 typically includes the base material and a resin layer formed thereon. A film base material can typically be used as the base material. Examples of the film base material can include a plastic film such as a polyethylene terephthalate (PET) film, a polyethylene naphthalate (PEN) film, and a polypropylene (PP) film. Alternatively, paper, synthetic paper, plastic multilayered paper, or a resin-impregnated paper may be used as the base material. The base material may also be omitted. For instance, when the relief structure forming layer 2 per se is a film-like compact, the base material can be omitted.

The resin layer is formed with the above-described method, for example. A thickness of the resin layer can be set in a range from 0.1 µm to 10 µm, for instance. If this thickness is too large, resin protrusion and/or wrinkle formation readily occurs due to application of pressure during processing. If this thickness is too small, it may be difficult to form a recessed structure and/or a projecting structure as desired. In the meantime, the thickness of the resin layer is set equal to or larger than the depth of each recessed portion or the height of each projecting portion to be provided on the principal surface thereof. For example, this thickness can be set in a range from 1 to 10 times of the depth of the recessed portion or the height of the projecting portion, or more typically in a range from 3 to 5 times thereof.

The formation of relief structures (the indented structures) of the relief structure forming layer 2 may be conducted by using any of a "pressing method" disclosed in Japanese Patent No. 4194073, a "casting method" disclosed in Japanese Utility Model Registration No. 2524092, and a "photopolymer method" disclosed in Japanese Patent Laid-Open No. 2007-118563, for example.

(Step (b))

As shown in FIG. 2(b), the first material different from the material of the relief structure forming layer 2 is deposited on the first region R1 and the second region R2 of the relief structure forming layer 2, thus forming a first material layer 4" having a surface shape corresponding to the surface shape of the relief structure forming layer 2. In this way, the first material laminate 20 is formed.

A publicly known coating method or vapor-phase deposition method capable of depositing the first material so as to correspond to the surface shape of the relief structure forming layer 2 can be used as the method of depositing the first material. An example of the coating method can include spray coating. Examples of the vapor-phase deposition can include a vacuum deposition method, a sputtering method, and a chemical vapor deposition method (CVD method). In particular, it is preferable to use a vapor-phase deposition method according to the steps (c) and (d) to be described later as the method of depositing the first material, because the use of the vapor-phase deposition method produces dense portions and sparse portions in the first material layer 4", thereby making it easier to selectively remove the first layer 4 and the second layer 6 in the first region R1 in the step (e) to be described later.

The first material is deposited in such a way as to correspond to the surface shape of the relief structure forming layer 2. Accordingly, the first material layer 4" formed by depositing the first material has the surface shape that corresponds to the surface of the relief structure forming layer 2. Further, the deposition of the first material is preferably conducted with a uniform density in an in-plane direction parallel to the principal surface of the relief structure forming layer 2. Specifically, the deposition is preferably conducted in such a way that a ratio of an amount of the first material at a position in the first region R1 to the apparent area of the first region R1 is equal to a ratio of an amount of the first material at a position in the second region R2 to the apparent area of the second region R2.

The first material is the material different from the material of the relief structure forming layer 2.

In the meantime, a material to be used as the first material can be selected as appropriate depending on the usage of the laminate.

For example, when using the laminate as an optical element, a material suitable for a reflective layer can be used as the first material. In this case, it is preferable to use a material having a difference in refractive index from the material of the relief structure forming layer 2 being equal to or above 0.2. If this difference is too small, reflection may hardly occur on an interface between the relief structure forming layer 2 and the first layer 4 to be described later.

When the laminate is used as an electronic circuit, a material suitable for a circuit conductive layer can be used as the first material.

As examples of the above-described first material, it is possible to point to at least one metal material selected from the group consisting of: metals Al, Sn, Cr, Ni, Cu, Au, Ag, and the like; compounds of any of the metals; and alloys of any of the metals. Here, a compound of a metal means a compound containing a metal element in the form of a metal oxide, a metal sulfide, and the like.

As for the material suitable for the reflective layer, any of ceramic materials and organic polymer materials listed below, each of which has relatively high transparency, may be used as the first material.

Specifically, any of $Sb_2O_3$, $Fe_2O_3$, $TiO_2$, $CdS$, $CeO_2$, $ZnS$, $PbCl_2$, $CdO$, $WO_3$, $SiO$, $Si_2O_3$, $In_2O_3$, $PbO$, $Ta_2O_3$, $Ta_2O_5$, $ZnO$, $ZrO_2$, $MgO$, $SiO_2$, $Si_2O_2$, $MgF_2$, $CeF_3$, $CaF_2$, $AlF_3$, $Al_2O_3$, silicon oxides ($SiO_X$, $1<X<2$), and $GaO$ can be used as the ceramic material, for example.

As the organic polymer material, for example, any of polyethylene, polypropylene, polytetrafluoroethylene, polymethylmethacrylate, and polystyrene can be used.

Meanwhile, final parameters such as the ratio of elements and the oxidation number of a deposited film may vary when the vapor-phase deposition takes place by using any of the aforementioned material as a target.

(Step (c))

The first material laminate 20 is located in the vapor-phase deposition apparatus such that the first direction described in the step (a) coincides with the direction of conveyance of the first material laminate 20 (FIG. 2(c)).

The expression "the first direction described in the step (a) coincides with the direction of conveyance of the first material laminate 20" means that the first direction coincides with the direction of conveyance of the first material laminate 20 at the time of vapor-phase deposition of the second material in the step (d) to be described later.

As the vapor-phase deposition apparatus, a publicly known apparatus can be used having a vapor deposition source necessary for performing the vapor-phase deposition of the second material, conveyance means for conveying the first material laminate 20, and the like. Such an apparatus to be used may be selected according to the vapor-deposition method to be applied. For example, it is possible to use a roll-type vacuum vapor deposition machine.

A publicly known source can be used as the vapor deposition source. For example, the vapor deposition source includes heating means for evaporating a vapor deposition material, and a container such as a crucible for containing the vapor deposition material.

Further, the vapor deposition source is preferably formed such that an aperture as an outlet of the gasified vapor deposition material is formed to have a length corresponding to a length of the first material laminate 20 in a width direction (a direction perpendicular to the direction of conveyance) of the first material laminate 20. Alternatively, multiple vapor deposition sources may be arranged along the width direction (the direction perpendicular to the direction of conveyance) of the first material laminate 20 so as to correspond to the length of the first material laminate 20.

(Step (d))

Next, the first material laminate 20 located in the step (c) is conveyed and the second material being different from the first material is vapor-phase deposited from an oblique direction onto the surface of the first material laminate on which the first material is deposited. Thus, the second material laminate 30 is formed (FIG. 2(d)).

A method of conveying the first material laminate 20 is not limited to a particular method as long as the method is capable of conveying the first material laminate 20 in the first direction, in which the indented structure in the first region R1 of the first material laminate 20 extends, at the time of the vapor-phase deposition of the second material. A method of conveying the first material laminate 20 fixed to a carrier film may be used. In the case of conveying the first material laminate 20 in a roll-to-roll method and where the first material laminate 20 has the form of a long and rolled-up roll, then the first material laminate 20 itself may be conveyed.

A conveyance speed of the first material laminate 20 may be set as appropriate while taking into account such factors as a film thickness of the layer to be made of the second material.

As a method of conveying the first material laminate 20 and vapor-depositing the second material from the oblique direction onto the surface of the first material laminate 20 on which the first material is deposited (that is, a surface of the first material layer 4"), it is possible to apply any method that is designed to deposit the second material from the oblique direction onto the surface of the first material layer 4" of first material laminate 20 while moving the first material laminate 20 so as to come close to the vapor deposition source and/or moving the first material laminate 20 so as to recede from the vapor deposition source.

A vapor-phase deposition method is used as a method of depositing the second material. Examples of the vapor-phase deposition method include a vacuum deposition method, a sputtering method, and a chemical vapor deposition method (a CVD method).

The deposition of the second material is preferably conducted with a uniform density in the in-plane direction parallel to the principal surface of the relief structure forming layer 2. Specifically, the deposition is preferably conducted in such a way that a ratio of an amount of the second material at a position in the first region R1 to the apparent area of the first region R1 is equal to a ratio of an amount of the second material at a position in the second region R2 to the apparent area of the second region R2.

The second material is the material different from the first material. Preferably, the second material is a material that does not react with (get dissolved in) a reactive gas or liquid used in the step (e) to be described later. This is due to a reason that the above-mentioned layer made of the second material functions as a mask layer in the second region R2 to protect the first material layer 4" against the reactive gas or the like so that the first material layer 4" can be prevented from being eroded by the reactive gas or the like. Furthermore, when the second layer 6 is left without conducting the step (f) to be described later, the second material may be determined in consideration of the usage of the laminate.

Assuming that the first material is aluminum, then examples of the second material include silicon oxides ($SiO_X$, $1<X<2$). Such a silicon oxide ($SiO_X$, $1<X<2$) is suitable for the second material because the silicon oxide has high resistance against acidic and alkaline solutions and is capable of forming a columnar structure or a porous structure by the oblique vapor deposition.

The vapor-phase deposition of the second material in the step (d) will be described further in detail with reference to FIGS. 3A to 3C.

Figure 3A:
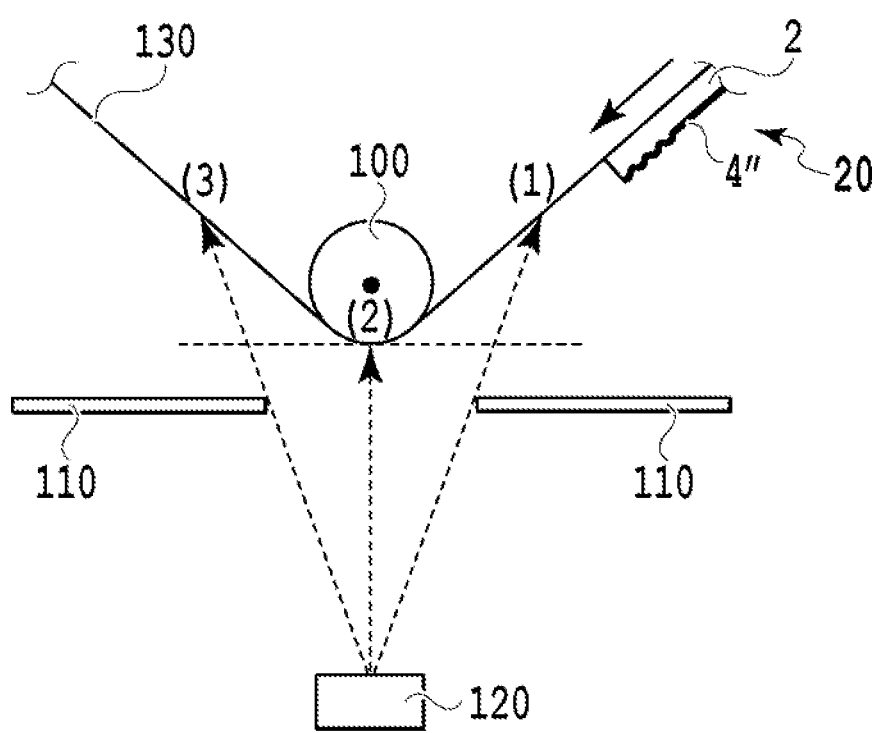
FIG. 3A is a schematic cross-sectional view showing an example of a vapor deposition apparatus in which the first material laminate is located.

FIG. 3A is a schematic cross-sectional view showing an example of a vapor deposition apparatus in which the first material laminate 20 is located.

In the example shown in FIG. 3A, the first material laminate 20 disposed on a carrier film 130 with the first material layer 4" being directed toward a vapor deposition source 120 is conveyed so as to be sequentially passed through positions (1), (2), and (3). Meanwhile, the second material evaporated from the vapor deposition source 120 reaches the positions (1), (2), and (3) through an aperture in a shield plate 110.

In the beginning, when the first material laminate 20 is conveyed to the position (1) in such a way as to come close to the vapor deposition source 120, the second material evaporated from the vapor deposition source 120 reaches the surface of the first material layer 4". In this case, the second material comes close to the surface of the first material layer 4" in the oblique direction, and gets deposited on the surface of the first material layer 4". As a consequence, the second material is obliquely deposited on the surface of the first material layer 4".

Next, when the first material laminate 20 is conveyed to the position (2) and reaches a peripheral surface of a roller 100, the second material comes close to the deposited surface of the first material laminate 20, and gets deposited thereon. Accordingly, the oblique vapor deposition does not take place at the position (2). As described above, the step (d) may also include a deposition subprocess that does not involve the oblique vapor deposition.

Thereafter, as the first material laminate 20 is conveyed in such a way as to recede from the vapor deposition source 120, the second material comes close obliquely to the surface of the first material laminate 20 and gets deposited on the surface.

Figure 3B:
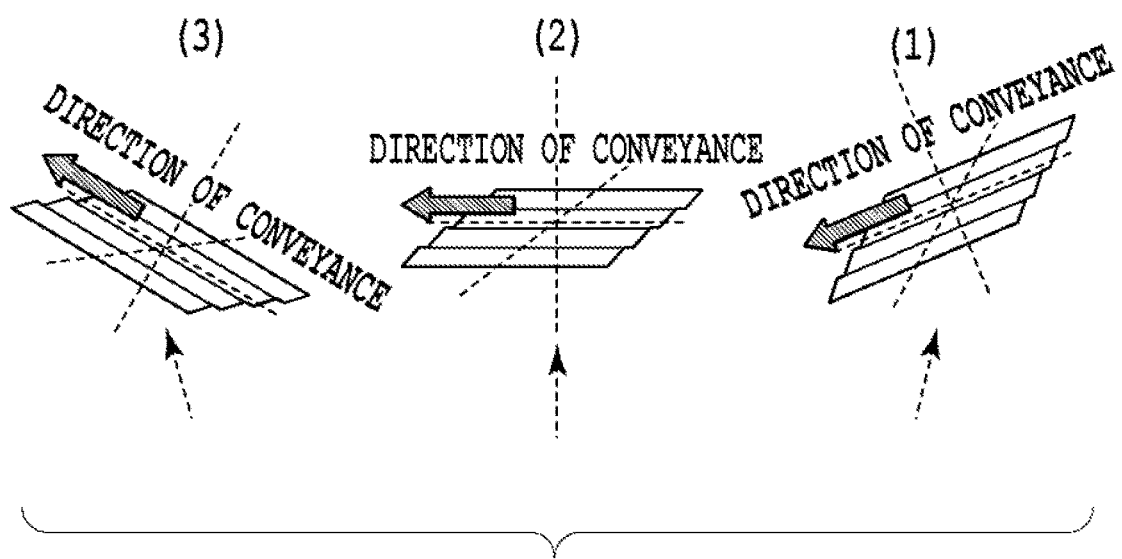
FIG. 3B includes schematic diagrams showing aspects of a deposited surface in a first region when the first material laminate are passed through positions (1), (2), and (3) in FIG. 3A.

FIG. 3B includes schematic diagrams showing aspects of the deposited surface in the first region R1 of the first material laminate 20 when the first material laminate 20 are passed through the positions (1), (2), and (3) in FIG. 3A. FIG. 3C includes schematic diagrams showing aspects of the deposited surface in the second region R2 of the first material laminate 20 when the first material laminate 20 are passed through the positions (1), (2), and (3) in FIG. 3A.

In the example shown in FIG. 3B, the indented structure on the deposited surface in the first region R1 of the first material laminate 20 extends in the first direction, and the direction of extension thereof coincides with the direction of conveyance of the first material laminate 20. On the other hand, in the example shown in FIG. 3C, the indented structure on the deposited surface in the second region R2 extends in the second direction, and the direction of extension thereof is orthogonal to the direction of conveyance of the first material laminate 20. As described above, since the direction of extension of the relief structure relative to the direction of conveyance in the first region R1 is different from that in the second region R2, a difference in the form of deposition of the second material on the deposited surface occurs as a consequence.

While the difference in the form of deposition is not bound by a theory, the inventor of present invention considers as follows.

Figure 4A:
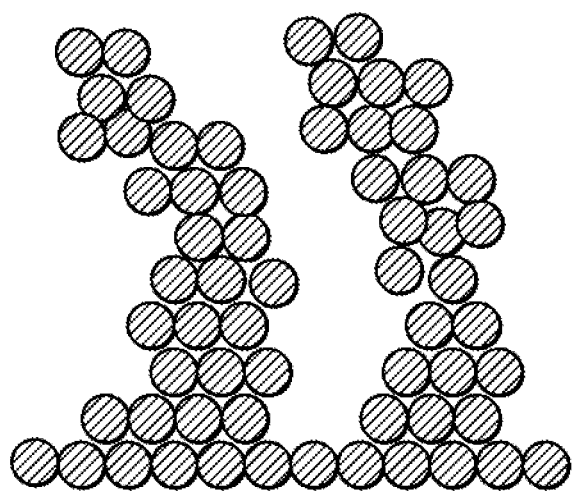
FIG. 4A is an estimated view showing a cross section of the form of deposition of a second material in the first region.

As described previously, in the example shown in FIG. 3B, the direction of extension of the indented structure formed on the surface of the first material layer 4" in the first region R1 coincides with the direction of conveyance of the first material laminate 20. The second material comes close to the surface of the first material layer 4", which has the aforementioned surface structure, from the oblique direction to the surface and begins to be deposited thereon. Hence, a shade that does not allow entry of the second material is created in this process, and a columnar structure including pores is eventually formed. As a consequence, a density of a film formed of the second material is lower in the first region R1. FIG. 4A shows an estimated cross-sectional view of the form of deposition of the second material in the first region R1.

Figure 3C:
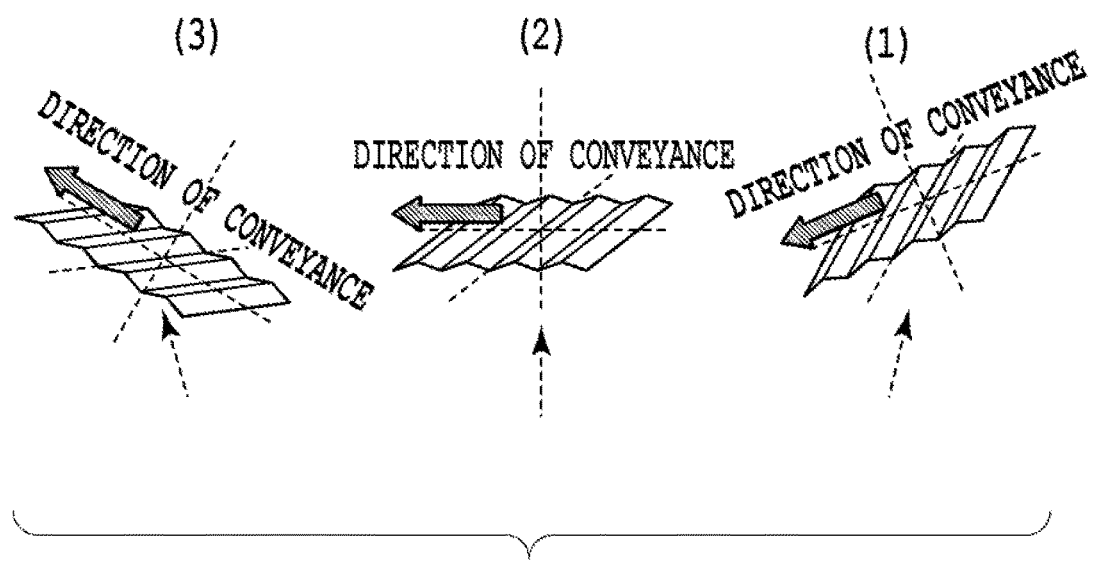
FIG. 3C includes schematic diagrams showing aspects of a deposited surface in a second region when the first material laminate are passed through the positions (1), (2), and (3) in FIG. 3A.
Figure 4B:
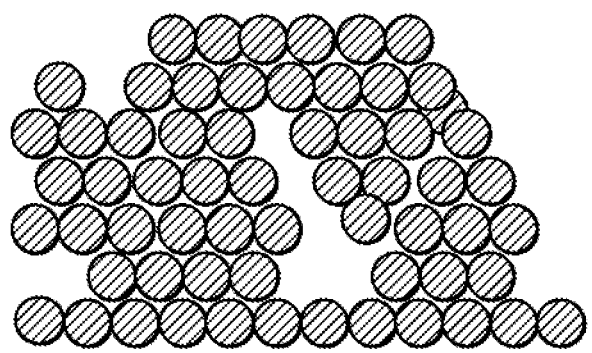
FIG. 4B is an estimated view showing a cross section of the form of deposition of the second material in the second region.

On the other hand, in the example shown in FIG. 3C, the direction of extension of the indented structure formed on the surface of the first material layer 4" in the second region R2 is orthogonal to the direction of conveyance of the first material laminate 20. For this reason, a shade that does not allow entry of the second material is less likely to be created as compared to the case of the first region R1. As a consequence, a density of a film formed of the second material is higher in the second region R2 because pores by the deposition of the second material are hardly formed therein. FIG. 4B shows an estimated cross-sectional view of the form of deposition of the second material in the second region R2.

(Step (e))

Next, the second material laminate 30 is exposed to the reactive gas or liquid that reacts with the first material. Thus, there is formed either the laminate 40 including the first layer 4' and the second layer 6 in this order only in the second region R2 (FIG. 2(e)) or a laminate including the first layer 4' and the second layer 6 in this order in the second region R2 and in part of the first region R1 (not shown).

As described above in conjunction with the step (d), it is contemplated that the pores are formed in a second material layer 6' in the first region R1 (FIG. 4A) whereas such pores are rare in the second region R2 (FIG. 4B). For this reason, in the first region R1, the reactive gas or liquid is more likely to permeate the second material layer 6' through the pores in the second material layer 6' and to come into contact with the first material layer 4" than in the second region R2.

When the reactive gas or liquid comes into contact with the first material layer 4" in the first region R1, etching of the first material layer 4" progresses in the in-plane direction. As a consequence, in the first region R1, the first material layer 4" is removed together with the second material layer 6' provided on this layer.

By adjusting a concentration and a temperature of an etchant, processing time of the etching, and the like as described above, it is possible to remove the first material layer 4" and the second material layer 6' only in the first region R1. Thus, it is possible to form the laminate which includes the first layer 4 and the second layer 6 in this order only in the second region R2 as shown in FIG. 2(e). The first layer 4' and the second layer 6 may be included in this order in part of the first region R1. In this case, the etching may be stopped before the first layer 4' in the first region R1 is completely removed. Meanwhile, the second layer 6 may be partially left in the first region R1.

In the case of using an etchant that dissolves the first material as the reactive gas or liquid, it is possible to use an alkaline solution such as a sodium hydroxide solution, a sodium carbonate solution, and a potassium hydroxide solution, or an acidic solution such as hydrochloric acid, nitric acid, sulfuric acid, and acetic acid. Alternatively, an etching gas capable of gasifying the first material may be used. Here, the reactive gas or liquid that does not dissolve the second material should be selected.

(Step (f))

Next, the second layer 6 is removed from the laminate 40 formed in the step (e). Thus, there is manufactured either the laminate 10 including the relief structure forming layer 2 and the first layer 4 provided in the second region R2 (FIG. 2(f)) or a laminate including the relief structure forming layer 2 and the first layer 4 provided in the second region R2 and in part of the first region R1 (not shown).

An example of a method of removing the second layer 6 includes a method of exposing the laminate 40 formed in the step (e) to a reactive gas or liquid, which is reactive with the second material constituting the second layer 6 but is not reactive with the first material constituting the first layer 4'.

In the case of using an etchant that dissolves the second material as the reactive gas or liquid, it is possible to use an alkaline solution such as a sodium hydroxide solution, a sodium carbonate solution, and a potassium hydroxide solution, or an acidic solution such as hydrochloric acid, nitric acid, sulfuric acid, and acetic acid. Alternatively, an etching gas capable of gasifying the second material may be used.

The laminate 10 including the relief structure forming layer 2 having the principal surface including the first region R1 and the second region R2, and the first layer 4 provided either only in the second region R2 or in the second region R2 as well as in part of the first region R1 of the relief structure forming layer 2 can be manufactured by conducting the above-described steps (a) to (f).

Note that only the steps (a) to (e) need to be conducted in the case of manufacturing the laminate 40 including the relief structure forming layer 2 having the principal surface including the first region R1 and the second region R2, and the first layer 4 and the second layer 6 provided in this order either only in the second region R2 or in the second region R2 as well as in part of the first region R1 of the relief structure forming layer 2.

As described above, according to the method of present invention, it is possible to provide the first layer 4 (and the second layer 6) at a desired position without using the difference in depth-to-width ratio between the indented structures in the first region R1 and the second region R2.

It is to be noted that the laminate and the manufacturing method thereof according to present invention described above may also include the following embodiments.

Although the case where the first layer 4 has a single-layer structure has been described above, the first layer 4 may have a multilayer structure instead. Thus, in such a laminate, the first layer 4 may constitute a multilayer interference film, for example.

In this case, the first layer 4 may include a multilayer film formed by laminating a mirror layer, a spacer layer, and a half mirror layer in this order from the relief structure forming layer 2 side, for example.

The mirror layer is a metal layer. The mirror layer may typically contain an elemental metal or an alloy of the metal. Examples of the metal to be contained in the mirror layer include aluminum, gold, copper, and silver. As the metal, aluminum is preferred in particular. A thickness of the mirror layer can be set equal to or below 300 nm, or typically set in a range from 20 to 200 nm, for example.

The spacer layer typically contains a dielectric material. A refractive index of the dielectric material is preferably set equal to or below 1.65. Moreover, the dielectric material is preferably transparent. Examples of such a dielectric material include $SiO_2$ and $MgF_2$. A thickness of the spacer layer can be set in a range from 5 to 500 nm, for example.

The half mirror layer is a light-permeable reflective layer. The half mirror layer may typically contain any of an elemental metal, an alloy of the metal, an oxide of the metal, and a sulfide of the metal. Examples of the metal and the metal alloy to be contained in the half mirror layer include aluminum, nickel, Inocel (registered trademark), titanium oxide ($TiO_2$), zinc sulfide (ZnS), molybdenum sulfide ($MoS_2$), iron (III) oxide ($Fe_2O_3$), and the like. A thickness of the half mirror layer may be set in a range from 5 to 80 nm, for example. This thickness is preferably set in a range from 30 to 80 nm in the case of using a metal oxide such as titanium oxide or a metal sulfide salt such as zinc sulfide, each of which represents a high refractive-index material with high transparency. Meanwhile, the thickness is preferably set in a range from 5 to 45 nm in the case of using a metal such as aluminum which has high reflectance and a high light shielding property.

Although the case where the second layer 6 has a single-layer structure has been described above, the second layer 6 may have a multilayer structure instead. Hence, in such a laminate 10, the second layer 6 may constitute a multilayer interference film, for example.

Alternatively, a laminated structure of the first layer 4 and the second layer 6 may constitute a multilayer interference film.

Figure 2:
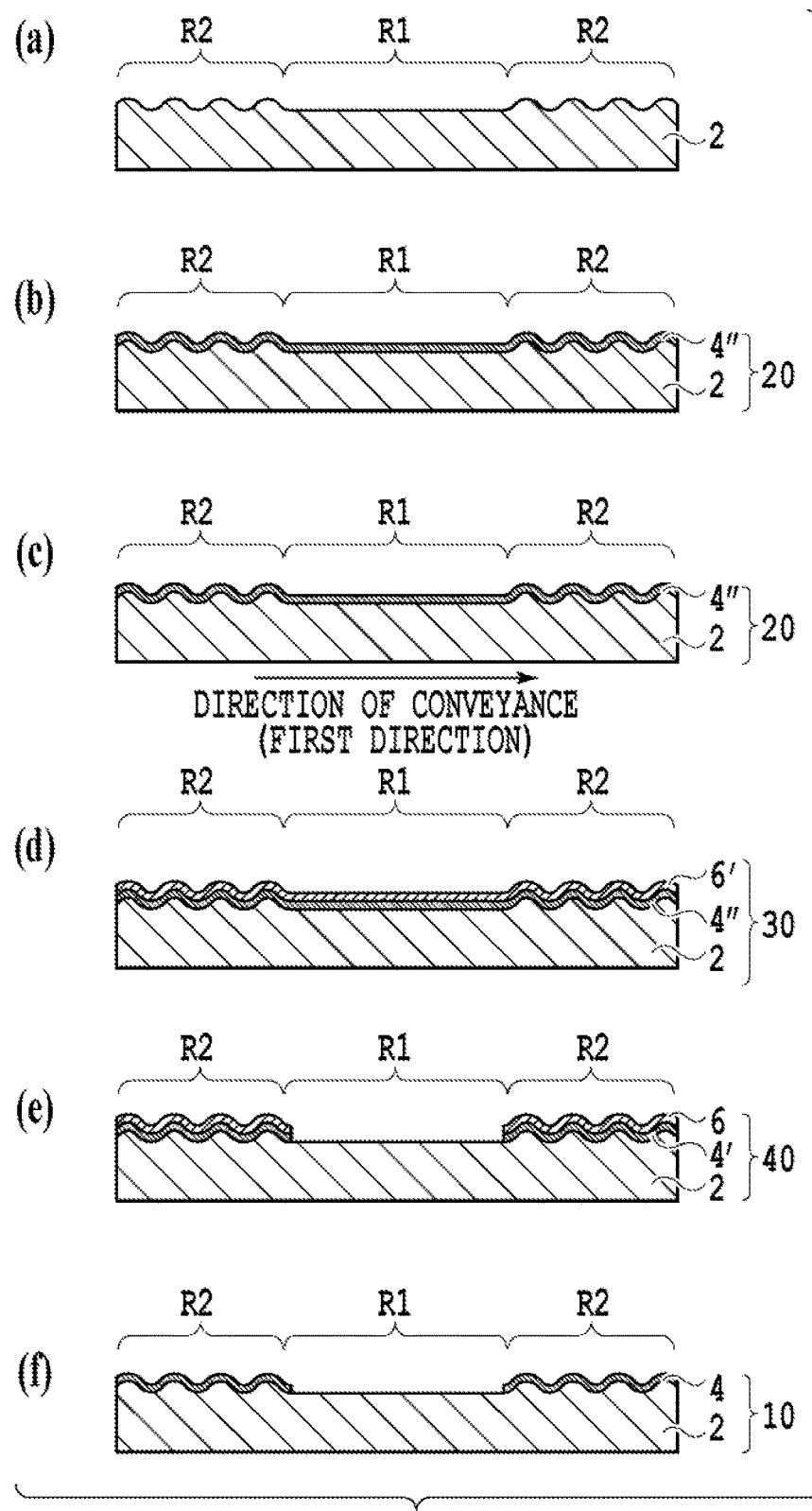

In these cases, it is possible to form a multilayer interference film stably and with high positional accuracy using the method described with reference to FIG. 2.

In the method described with reference to FIG. 2, the steps (b) to (e) may be repeated after the first layer 4 and the second layer 6 are formed in the step (e). This can obtain a structure in which the first layers 4 and the second layers 6 are alternately laminated in the second region R2, and form the multilayer interference film in the second region R2 stably and with high positional accuracy, for example.

In the laminate including the first layer 4 and the second layer 6 in this order in the second region R2 on the relief structure forming layer 2, only the first layer 4 in the second region R2 may be subjected to side etching by way of over-etching. When this laminate is observed from the first layer 4 side, the first layer 4 is rimmed with the second layer 6. Accordingly, designability and a forgery prevention performance are improved when the material of the second layer 6 has a special optical property.

In the method (the step (e)) described with reference to FIG. 2, a gas or a liquid that is capable of transforming part of the first layer 4 into a layer composed of a different material by a reaction with the first material may be used as the reactive gas or liquid. In this case, it is possible to transform a portion of the first layer 4 corresponding to the first region R1 into the layer made of a material different from the material of the first layer instead of removing the portion corresponding thereto, for example.

An oxidizing agent capable of oxidizing the material of the first layer 4 can be used as the above-mentioned reactive gas or liquid. Examples of the oxidizing agent usable herein include: oxygen; ozone; halogens; halides including chlorine dioxide, hypohalous acids, halous acids, sub-halogen acids, hyperhalous acids, salts thereof, and the like; inorganic peroxides including hydrogen peroxide, persulfates, peroxocarbonates, peroxosulfates, peroxophosphates, and the like; organic peroxides including benzoyl peroxide, t-butyl hydroperoxide, cumene hydroperoxide, diisopropylbenzene hydroperoxide, performic acid, peracetic acid, perbenzoic acid, and the like; metals and metal compounds including cerium salts, Mn (III), Mn (IV) and Mn (VI) salts, silver salts, copper salts, chromium salts, cobalt salts, dichromates, chromates, permanganates, magnesium perphthalate, ferric chloride, cupric chloride, and the like; and inorganic acids and inorganic acid salts including nitric acid, nitrates, bromates, periodates, iodates, and the like.

When Cu is used as the material of the first layer 4, for example, at least a portion of the first material layer 4" corresponding to the second region R2 can be transformed into a layer made of a copper oxide by a reaction of the portion with the oxidizing agent. In the meantime, when Al is used as the material of the first layer 4, at least the portion of the first material layer 4" corresponding to the second region R2 can be transformed into a layer made of an aluminum oxide such as boehmite by immersion of the portion into boiling water or by a reaction of the portion with the oxidizing agent.

Alternatively, a reducing agent capable of reducing the material of the first layer 4 can be used as the above-mentioned reactive gas or liquid. Examples of the reducing agent to be used herein include: hydrogen sulfide, sulfur dioxide, hydrogen fluoride, alcohols, carboxylic acids, hydrogen gas, hydrogen plasma, remote hydrogen plasma, diethylsilane, ethylsilane, dimethylsilane, phenylsilane, silane, disilane, aminosilane, borane, diborane, alane, germane, hydrazine, ammonia, methylhydrazine, 1,1-dimethylhydrazine, 1,2-dimethylhydrazine, t-butylhydrazine, benzylhydrazine, 2-hydrazinoethanol, 1-n-butyl-1-phenylhydrazine, phenylhydrazine, 1-naphthylhydrazine, 4-chlorophenylhydrazine, 1,1-diphenylhydrazine, p-hydrazinobenzenesulfonic acid, 1,2-diphenylhydrazine, acetylhydrazine, and benzoylhydrazine.

In the manufacturing method of present invention described above, a surface of each layer may also be subjected to any of a plasma treatment, a corona treatment, and a flame treatment.

Furthermore, in the manufacturing method of present invention described above, a publicly known method may be combined in order to provide the first layer (the functional layer such as the reflective layer and the conductive layer) in part. Examples of the publicly known method include: a laser method of removing the reflective layer in the form of a pattern by use of a laser; and a method of providing a mask in the form of a pattern on the reflective layer and then removing portions of the reflective layer not covered with the mask.

Alternatively, a method of setting a patterned mask on a principal surface of a layer or a base material, forming the reflective layer on the entire principal surface, and then removing portions of the reflective layer located on the mask together with the mask may be used in the manufacturing method of present invention described above. The formation of the mask can be performed in accordance with a printing method or a photoresist method. In a typical case, after the relief structure forming layer is formed in the step (a), a mask ink formed of a water-soluble resin is printed across the first region and the second region in accordance with the printing method. Subsequently, the first material laminate is formed in the step (b) by using aluminum as the first material, and the second material laminate is formed in the steps (c) and (d) by using silicon oxide as the second material. Thereafter, etching with alkaline water is performed in the step (e). At each portion coated with the water-soluble mask ink, the first material and the second material can be removed regardless of a difference in etching speed attributed to the directions of extension of the indented structures. Accordingly, the first material can be removed even in the second region by combining present invention with the publicly known method that uses the water-soluble mask ink. As a consequence, it is possible to constitute more complex drawing patterns.

Further, in the manufacturing method of present invention described above, the relief structure forming layer is formed in the step (a), and then the first material laminate is formed in the step (b) by using aluminum as the first material. Then, the second material laminate is formed in the steps (c) and (d) by using silicon oxide as the second material. Subsequently, the mask ink formed of an "alkaline water-resistant resin" is printed across the first region and the second region in accordance with the printing method. Thereafter, the etching with the alkaline water is performed in the step (e). At each portion printed with the "alkaline water-resistant resin" mask ink, the mask ink prevents permeation of the etchant, thereby leaving aluminum and silicon oxide at each portion unetched. Accordingly, it is possible to leave the first material even in the first region by combining present invention with the publicly known method that uses the "alkaline water-resistant resin" mask ink. As a consequence, it is possible to constitute more complex drawing patterns.

In the laminate of present invention, the direction of extension of the indented structure in each of the first region and the second region can be set in such a way as to define a specific angle. This makes it possible to constitute complex drawing patterns when either the metal reflective layer or the transparent reflective layer of the metal oxide or the like is provided as the first layer in both of the first region and the second region. For example, the laminate can bring about a two-image switching effect (a changing effect) when the first region and the second region are provided with the indented structures having the directions of extension being orthogonal to each other but in the same shape with the aspect ratio of 0.2 and the pitches of 1 µm. Specifically, this effect renders the diffracted light in the second region invisible when the diffracted light originating from the indents in the first region is visible, and renders the diffracted light in the second region visible when the diffracted light originating from the indents in the first region is invisible on the other hand.

The laminate of present invention may further include any of a covering layer (a protective layer) to cover the first layer 4 and/or the second layer 6, an anchor layer for improving adhesion between the layers, a functional layer that is different from the first layer 4, a printed layer using a color ink or a special ink in order to improve a design property and a forgery prevention property, and other layers. Meanwhile, dyes and pigments for color inks and special inks may be contained in the layers of the laminate.

In the meantime, since the first layer 4 is provided with high positional accuracy, the laminate of present invention can also be used as a photomask.

Note that two or more of the various embodiments and modified examples described above may be carried out in combination.

Second Embodiment

Next, a second embodiment of present invention will be described.

A laminate of this embodiment has such a feature that the second region of the first embodiment includes multiple subregions. Here, between two different subregions, at least any of the following features are different from each other, namely, the directions of extension, the pitches, and the depths (the heights) of the indented structures.

Figure 5:
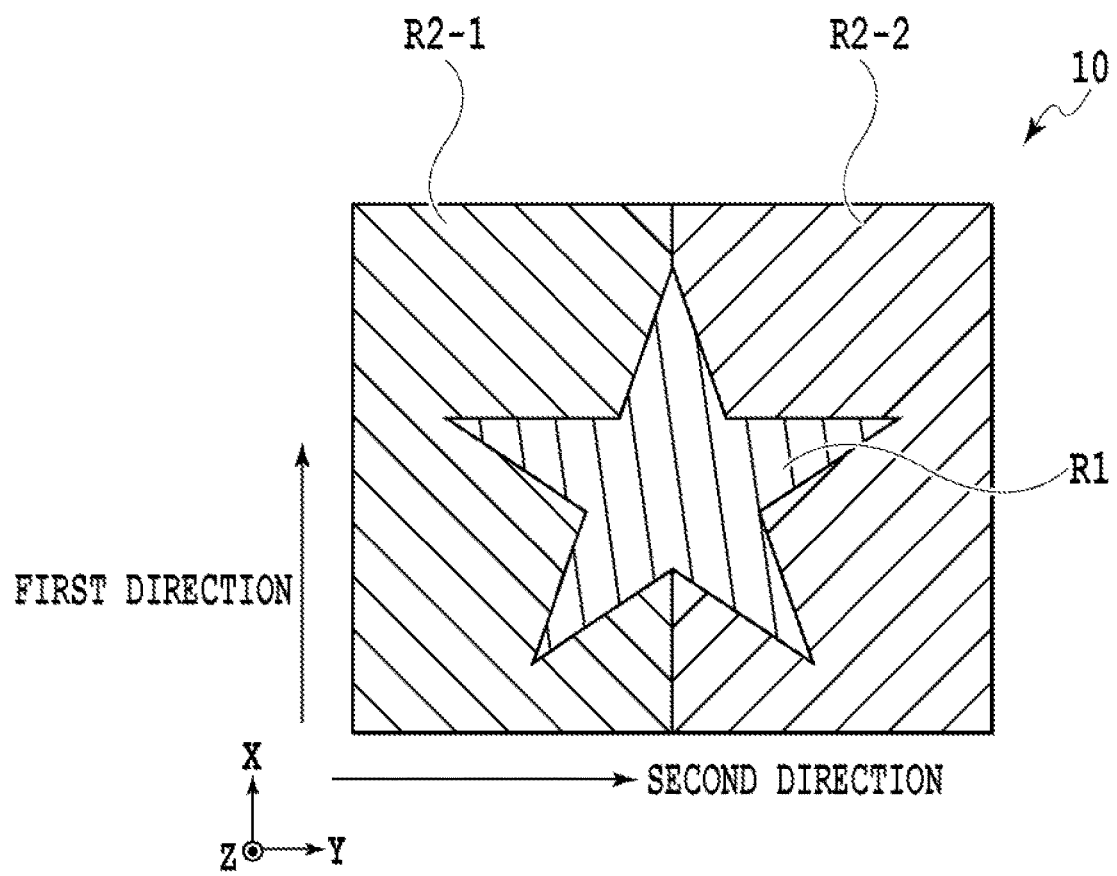
FIG. 5 is a schematic plan view showing a laminate according to a second embodiment of present invention.

FIG. 5 is a schematic plan view showing the laminate 10 according to the second embodiment of present invention. In the laminate 10 shown in FIG. 5, the first region R1 includes an indented structure which extends in a direction tilted by 8 degrees to the left (−8 degrees) from the first direction. The second region includes two subregions which have the indented structures with the directions of extension being different from each other. Specifically, the second region includes a second subregion R2-1 which has an indented structure extending in a direction tilted by 45 degrees to the right (+45 degrees) from the second direction, and a second subregion R2-2 which has an indented structure extending in a direction tilted by 45 degrees to the left (−45 degrees) from the second direction.

This embodiment is not limited to the directions of extension of the indented structures shown in FIG. 5. As described in the first embodiment, the direction of extension of the indented structure in the first region R1 may be set in the first direction or a direction tilted by an angle within 10 degrees to the left or right from the first direction. Meanwhile, the direction of extension of each indented structure in the second region (the second subregion) may also be set in the second direction or a direction tilted by an angle within 65 degrees to the left or right from the second direction.

FIG. 5 illustrates the example of the subregions in the second region, which have the indented structures extending in the directions different from each other. However, in this embodiment, the second region may include subregions having at least any of the following features that are different from each other, namely, the directions of extension, the pitches, and the depths (the heights) of the indented structures.

In addition, while the second region includes the two subregions in the example shown in FIG. 5, the number of subregions is not limited only to two and the second region may include three or more subregions.

As described above, the laminate 10 of this embodiment can realize a complex structure by providing the second region with the multiple subregions. Various drawing patterns can be formed in the second region (the second subregions) since the second region includes the first layer (the reflective layer).

The laminate 10 according to the second embodiment can be manufactured in accordance with the method described in the previous section <Manufacturing Method of Laminate>. To be more precise, the relief structure forming layer may be formed in the step (a) in such a way that the first region R1 and the second region R2 have the desired indented structures, and then the steps (b) to (f) may be carried out.

According to this manufacturing method, even when the multiple subregions having the varied features of any of the directions of grooves, the pitches, the depths, and the like are provided in the second region, it is still possible to selectively provide the first layer to these subregions.

Third Embodiment

Next, a third embodiment of present invention will be described.

A laminate of this embodiment has such a feature that each of the first region and second region of the first embodiment includes multiple subregions. Between two different subregions, at least any of the following features are different from each other, namely, the directions of extension, the pitches, and the depths (the heights) of the indented structures.

Figure 6:
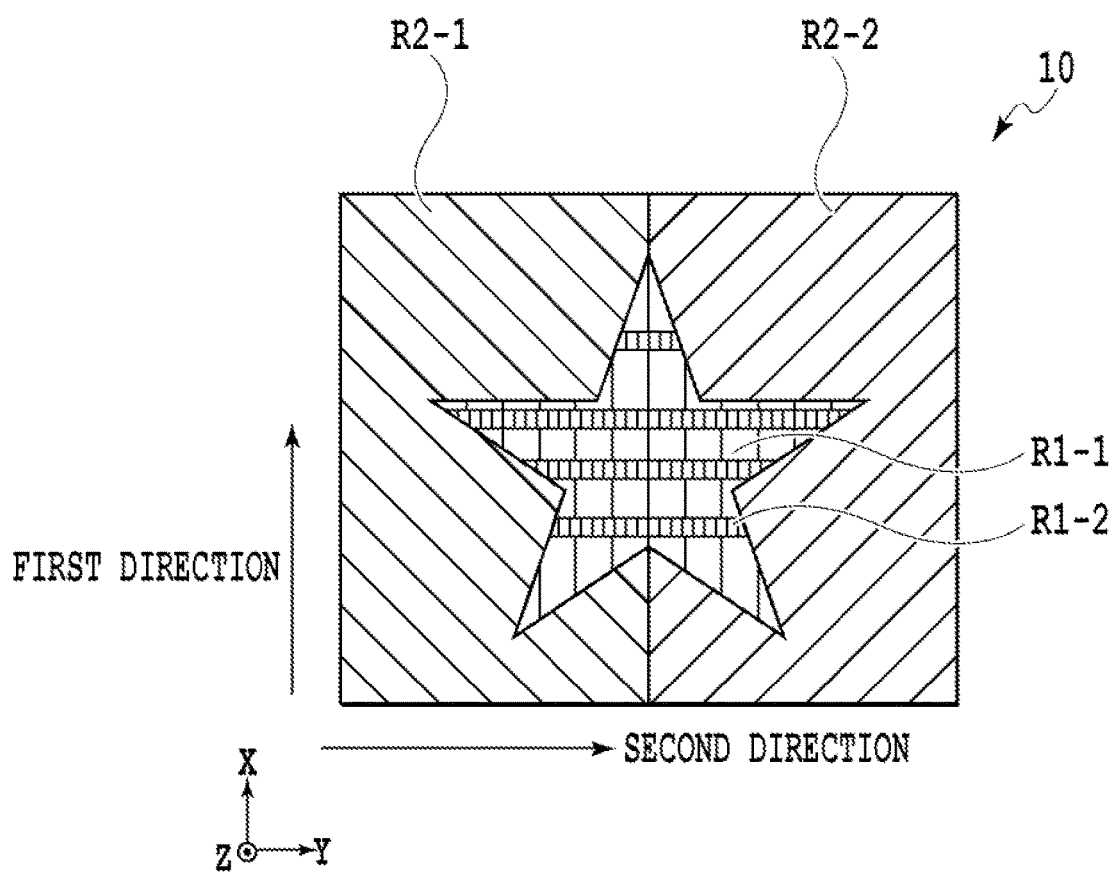
FIG. 6 is a schematic plan view showing a laminate according to a third embodiment of present invention.

FIG. 6 is a schematic plan view showing the laminate 10 according to the third embodiment of present invention. In the laminate 10 shown in FIG. 6, each of the first region and the second region includes two subregions.

In the laminate 10 shown in FIG. 6, the first region includes two subregions with indented structures, which have the same direction of extension but different pitches, depths, and aspect ratios. Specifically, the first region includes: a first subregion R1-1 which has an indented structure extending in the first direction, and has the pitch of 600 nm, the depth of 150 nm, and the aspect ratio of 0.25; and a first subregion R1-2 which has an indented structure extending in the first direction, and has the pitch of 400 nm, the depth of 400 nm, and the aspect ratio of 1.00.

This embodiment is not limited to the directions of extension of the indented structures shown in FIG. 6. As described in the first embodiment, the direction of extension of each indented structure in the first region (the first subregion) may be set in the first direction or a direction tilted by an angle within 10 degrees to the left or right from the first direction. In addition, regarding the pitches, the depths, and the aspect ratios of the indented structures, this embodiment can adopt those described in the first embodiment.

In FIG. 6, the second region includes the two subregions which have the indented structures with the directions of extension being different from each other. Specifically, the second region includes the second subregion R2-1 which has the indented structure extending in the direction tilted by 45 degrees to the right (+45 degrees) from the second direction, and the second subregion R2-2 which has the indented structure extending in the direction tilted by 45 degrees to the left (−45 degrees) from the second direction.

This embodiment is not limited to the directions of extension of the indented structures shown in FIG. 6. As described in the first embodiment, the direction of extension of each indented structure in the second region (the second subregion) may be set in the second direction or a direction tilted by an angle within 65 degrees to the left or right from the second direction.

FIG. 6 illustrates the example of the subregions in the second region, which have the indented structures extending in the directions different from each other. However, in this embodiment, the second region may include subregions having at least any of the following features that are different from each other, namely, the directions of extension, the pitches, and the depths (the heights) of the indented structures.

In addition, while each of the first region and second region includes the two subregions in FIG. 6, the number of subregions is not limited only to two and each of the first region and the second region may include three or more subregions.

In present invention, the depth of the indented structure provided in the subregion R1-2 may be increased as in the laminate 10 shown in FIG. 6. In this way, adhesion between two upper and lower layers interposing the indented structure is improved by an anchor effect (a wedge effect). Alternatively, a similar anchor effect can also be obtained by forming the indented structure having a rectangular cross-sectional shape instead of using the indented structure of a high aspect ratio.

The laminate 10 of present invention can also ensure high adhesion by partially providing any of the above-described structures having the anchor effect.

The laminate 10 according to the third embodiment can be manufactured in accordance with the method described in the previous section <Manufacturing Method of Laminate>. To be more precise, the relief structure forming layer may be formed in the step (a) in such a way that the first region R1 and the second region R2 have the desired indented structures, and then the steps (b) to (f) may be carried out.

Fourth Embodiment

Next, a fourth embodiment of present invention will be described.

A laminate of this embodiment similar to that of third embodiment includes the first region and second region with multiple subregions. Here, between two different subregions, at least any of the following features are different from each other, namely, the directions of extension, the pitches, and the depths (the heights) of the indented structures.

Figure 7:
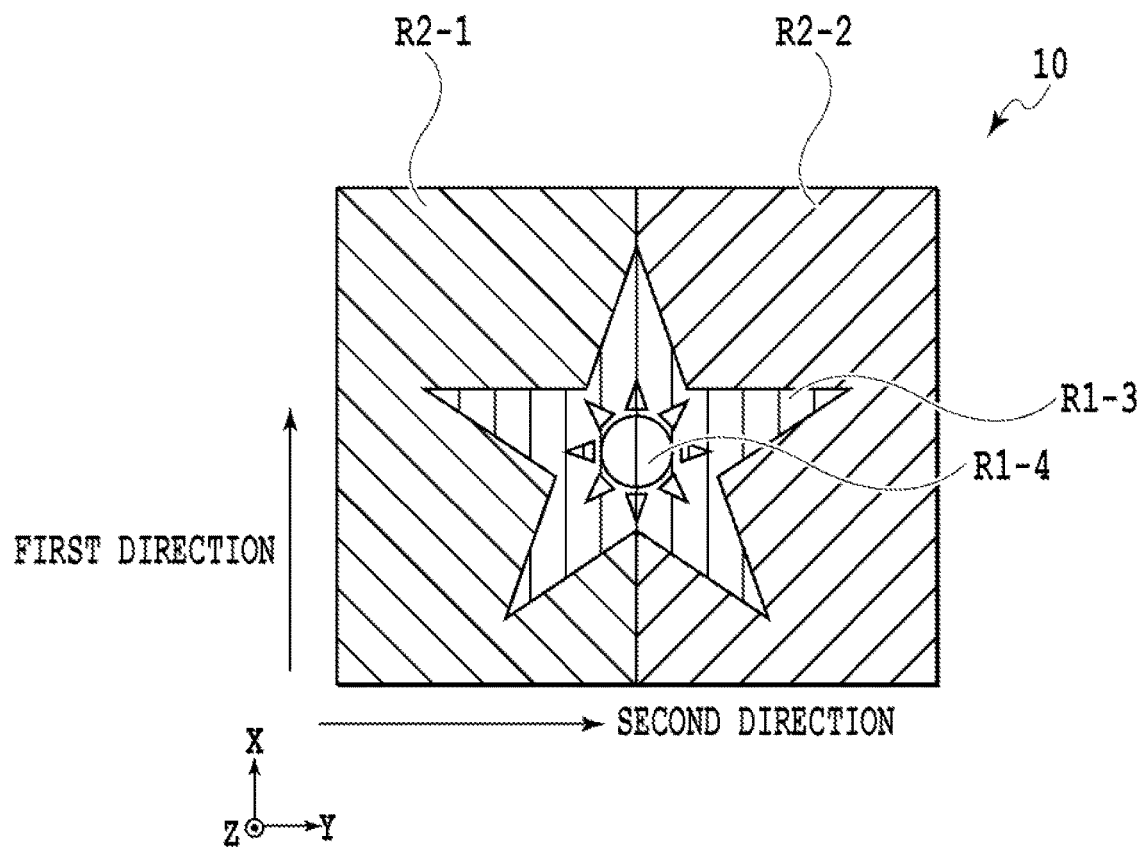
FIG. 7 is a schematic plan view showing a laminate according to a fourth embodiment of present invention.

FIG. 7 is a schematic plan view showing the laminate 10 according to the fourth embodiment of present invention.

In the laminate 10 shown in FIG. 7, the first region includes two subregions with indented structures, which have the pitches and the aspect ratios being different from each other. Specifically, a first subregion R1-3 extends in the first direction and forms a drawing pattern of a star including a diffraction structure having a sinusoidal cross-sectional shape with the pitch of 600 nm, the depth of 150 nm, and the aspect ratio of 0.25. A first subregion R1-4 extends in the first direction and forms a drawing pattern of the sun including a diffraction structure having a sinusoidal cross-sectional shape with the pitch of 750 nm, the depth of 150 nm, and the aspect ratio of 0.20.

The second region includes the two subregions which have the indented structures with the directions of extension being different from each other. Specifically, the second region includes the second subregion R2-1 which has the indented structure extending in the direction tilted by 45 degrees to the right (+45 degrees) from the second direction, and the second subregion R2-2 which has the indented structure extending in the direction tilted by 45 degrees to the left (−45 degrees) from the second direction.

This embodiment is not limited to the example shown in FIG. 7 in light of the directions of extension, the pitches, the depths, and the aspect ratios of the indented structures. This embodiment can also adopt those described in the first embodiment.

In the laminate 10 shown in FIG. 7, the first layer is taken away in the first region (the first subregions). Accordingly, it is also possible to obtain a diffraction effect in the first subregions by providing the first region with a third layer made of a highly refractive material being different from the material of the first layer. Specifically, when aluminum is used as the material of the first layer while zinc sulfide being a highly transparent and highly refractive material is used as the material of the third layer, bright diffraction light attributed to aluminum is observed in each of the second subregions R2-1 and R2-2 while highly transparent diffraction light can be obtained in each of the first subregions R1-3 and R1-4.

The laminate 10 according to the fourth embodiment can be manufactured in accordance with the method described in the previous section <Manufacturing Method of Laminate>. To be more precise, the relief structure forming layer may be formed in the step (a) in such a way that the first region R1 and the second region R2 have the desired indented structures, and then the steps (b) to (f) may be carried out. Here, if the third layer is provided, then the material of the third layer may be deposited so as to form a desired film thickness on the entire surfaces of the first and second regions on the first layer side of the laminate 10 obtained in the step (f).

A publicly known coating method or vapor-phase deposition method can be used as the method of depositing the material of the third layer. For example, a coating method such as spray coating can be used as the coating method. As for the vapor-phase deposition method, it is possible to use any of vapor-deposition methods of a vacuum deposition method, a sputtering method, a chemical vapor deposition method (CVD method), and the like.

A highly transparent and highly refractive material such as zinc sulfide and titanium oxide can be used as the material of the third layer.

Fifth Embodiment

Next, a fifth embodiment of present invention will be described.

This embodiment has such a feature that the first layer, the second layer, and an etching mask layer are included in this order in part of the first region of the relief structure forming layer of the first embodiment.

Figure 8A:
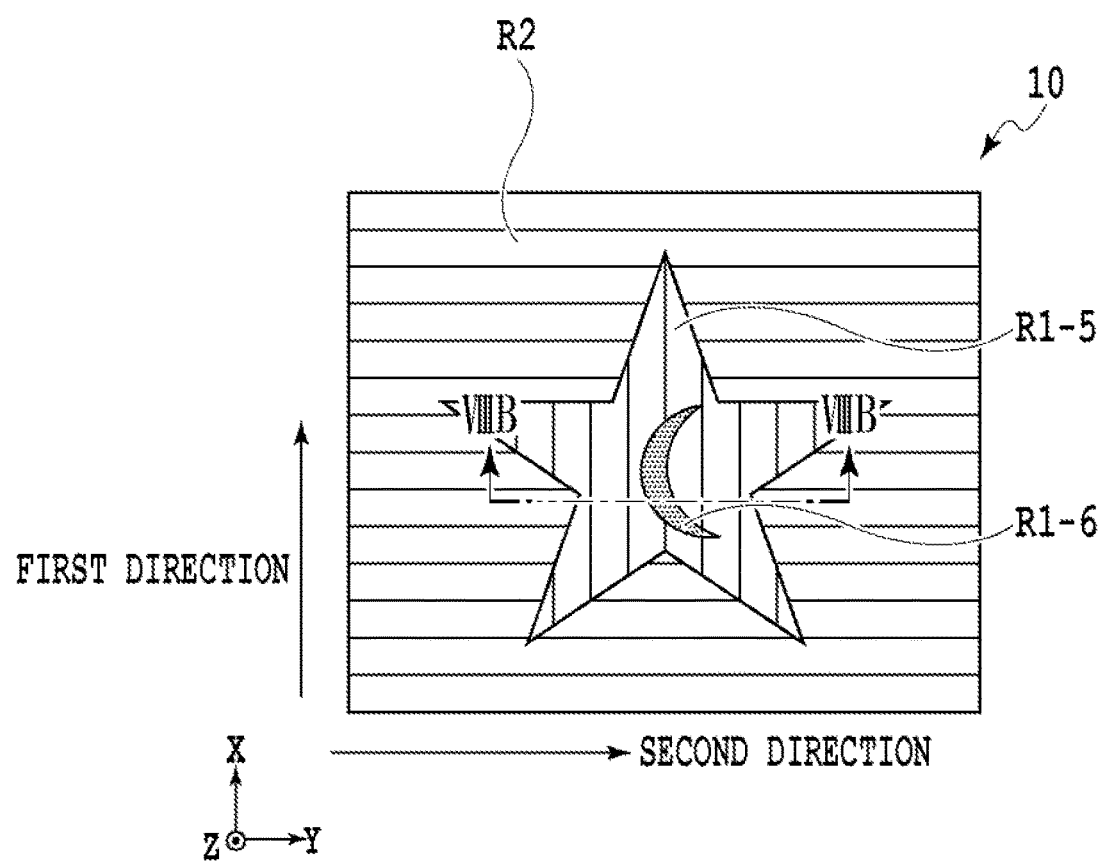
FIG. 8A is a schematic plan view showing a laminate according to a fifth embodiment of present invention.
Figure 8B:
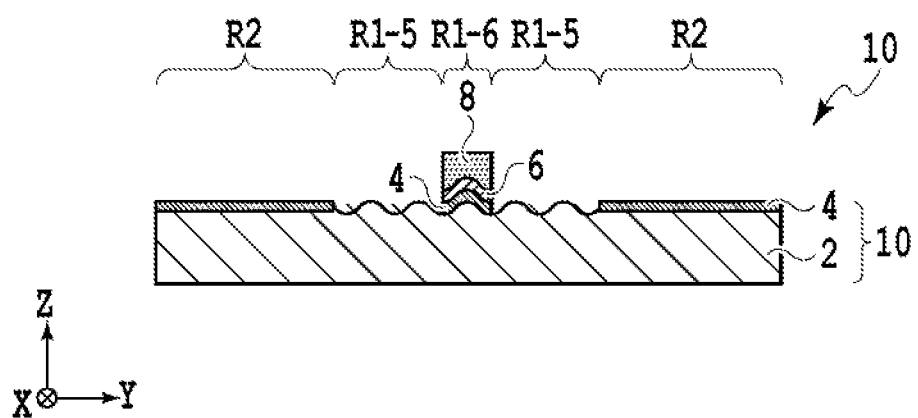
FIG. 8B is a cross-sectional view taken along the VIIIB-VIIIB line in FIG. 8A.

FIG. 8A is a plan view schematically showing the laminate 10 according to the fifth embodiment, and FIG. 8B is a cross-sectional view taken along the VIIIB-VIIIB line in FIG. 8A.

As shown in FIG. 8A, the first region has the indented structure that extends in the first direction and includes first regions R1-5 and R1-6 in shapes of a star and a crescent, respectively. The second region R2 has the indented structure that extends in the second direction.

As illustrated in FIG. 8B, the laminate 10 shown in FIG. 8A includes the relief structure forming layer 2, the first layer 4 in the second region R2 and the first region R1-6, and the second layer 6 and an etching mask layer 8 in the first region R1-6, which are provided in this order.

Without limitation to the directions of extension of the indented structures shown in FIG. 8A, the directions described in the first embodiment are also included in this embodiment. Moreover, the pitches, the depths, and the aspect ratios of the indented structures described in the first embodiment can be adopted.

The laminate 10 of this embodiment can retain the shape of the etching mask layer 8 as individual information, because the shape of the etching mask layer 8 is formed in close relation with a pattern of the relief structure forming layer and it is therefore extremely difficult to alter the individual information. As a consequence, the laminate 10 of this embodiment exerts a high forgery prevention effect.

Regarding a method of manufacturing the laminate 10 according to the fifth embodiment, the second material laminate 30 is formed in the first place by conducting the steps (a) to (d) corresponding to FIGS. 2(a) to 2(d) of the method described with reference to FIG. 2. Subsequently, a material of the etching mask layer 8 is deposited at a prescribed position in the first region to form the etching mask layer 8.

The etching mask layer 8 can be disposed by use of a publicly known method such as a printing method and a lithography method. Examples of the material of the etching mask layer 8 usable herein include thermoplastic resins, thermosetting resins, and radiation curable resins. In addition, in order to enhance designability and the forgery prevention performance, a functional pigment serving as a special pigment for security such as a fluorescent pigment and a phosphorescent pigment as well as a color material may be added to any of the aforementioned materials.

Subsequently, the laminate 10 inclusive of the etching mask layer 8 is exposed to the reactive gas or liquid that reacts with the first material constituting the first material layer 4". Though pores are formed in the second material layer 6' at the portion R1-5 in the first region R1, such pores are rare in the second region R2. Accordingly, the portion R1-5 in the first region is more susceptible to etching than the second region R2. Moreover, as shown in FIG. 8B, the etching mask layer 8 is not formed at the portion R1-5 in the first region whereas the etching mask layer 8 is formed at the portion R1-6 in the first region. Accordingly, the portion R1-5 in the first region is more susceptible to etching than the portion R1-6 in the first region.

For this reason, it is possible to remove the first layer 4 and the second layer 6 at the portion R1-5 in the first region by adjusting the concentration and the temperature of the reactive gas or liquid, the processing time of the etching, and the like.

Lastly, the second layer in the second region R2 is removed from the laminate obtained by the etching.

An example of a method of removing the second layer includes a method of exposing the laminate obtained by the etching to a reactive gas or liquid, which reacts only with the second material constituting the second layer 6.

The second layer at the portion R1-6 in the first region R1 is provided with the etching mask layer 8, and therefore remains without being removed by the etching.

In this way, the laminate 10 according to the fifth embodiment can be obtained as shown in FIGS. 8A and 8B.

As described above, it is possible to achieve more complex patterning of the first layer by combining the manufacturing method of the laminate 10 according to the first embodiment with the publicly known printing method and the like for forming the etching mask layer 8.

The various embodiments described above may also be applied in combination.

The laminate of present invention may be used as part of an adhesive label. Such an adhesive label includes the laminate, and an adhesive layer provided on a back surface of the laminate.

In the meantime, the laminate of present invention may also be used as a portion of a transfer foil. Such a transfer foil includes the laminate and a support layer releasably supporting the laminate.

The laminate of present invention may also be used by being supported by an article. For example, the laminate of present invention may be supported by a plastic card and the like. Meanwhile, the laminate of present invention may be used by being embedded in a paper. The laminate of present invention may also be crushed into scales and used as an ingredient of a pigment.

The laminate of present invention may be used for purposes other than forgery prevention. For instance, the laminate can also be used in a toy, a learning material, an ornament, and an electronic circuit.

EXAMPLES

Now, present invention will be specifically explained by representing examples. It is to be noted, however, that present invention is not limited to the following examples.

Manufacture of Laminates of Present Invention

Example 1

First, an ink composition described below was prepared as a raw material of the "relief structure forming layer":

"Relief Structure Forming Layer Ink Composition" (Ultraviolet Curable Resin)
Urethane acrylate 50.0 parts by mass (hitaroide 7903 manufactured by Hitachi Chemical: polyfunctional)
Methylethylketone 30.0 parts by mass
Ethyl acetate 20.0 parts by mass
Photoinitiator 1.5 parts by mass (Irgacure 184 manufactured by Ciba Specialty Chemicals).

The "relief structure forming layer ink composition" was coated on a support made of a transparent polyethylene terephthalate (PET) film having a thickness of 23 μm using gravure printing, and then dried, resulting in the relief structure forming layer with a dry film thickness of 1 μm on the support.

Subsequently, molding was performed by use of a roll photopolymer method, in which a cylindrical original plate including the "first region" and the "second region" having the desired indented structures was pressed against the coated surface at a pressure of 2 Kgf/cm$^2$, a press temperature of 80° C., and a press speed of 10 m/min.

Along with the molding, ultraviolet exposure at 300 mJ/cm$^2$ for the curing was conducted from the PET film side by using a high-pressure mercury lamp.

In this way, the relief structure forming layer was obtained in which the "first region" had a corrugated plate structure with a depth of 120 nm and a pitch of 700 nm, the "second region" had a corrugated plate structure with a depth of 120 nm and a pitch of 700 nm, and the direction of extension of the corrugated plate structure in the first region was orthogonal to the direction of extension of the corrugated plate structure in the second region.

Subsequently, the relief structure forming layer was located in the roll-type vacuum vapor deposition machine such that a direction of conveyance of the film by the vapor deposition machine was parallel to (coincided with) the direction of extension of the corrugated plate structure in the first region. Thereafter, the first material laminate was formed by performing oblique vacuum vapor deposition of aluminum as the first material on the entire surface of the relief structure forming layer such that a flat smooth plane portion thereof had a thickness of 70 nm.

Moreover, the first material laminate was located in the roll-type vacuum vapor deposition machine such that the direction of conveyance of the film by the vapor deposition machine was parallel to the direction of extension of the corrugated plate structure in the first region. Thereafter, the second material laminate was formed by performing oblique vacuum vapor deposition of silicon oxide as the second material on the entire surface of the first material layer of the first material laminate such that a flat smooth plane portion thereof had a thickness of 50 nm.

Subsequently, the second material laminate was immersed for one minute in a sodium hydroxide aqueous solution having a mass concentration of 1.5% and a temperature of 45° C., and the laminate was obtained which sequentially included the aluminum layer (the first layer) and the silicon oxide layer (the second layer) only in the second region of the relief structure forming layer.

Thereafter, the first layer and the second layer patterned by the etching were covered with the covering layer in order to protect these layers. Specifically, a "covering layer ink composition" described below was coated with a bar-coat printing method on the entire surface on the first layer and the second layer side patterned by the etching. Then, the coated body was dried for one minute in an oven at 120° C., to obtain the laminate with the covering layer having a dried film thickness of 2 μm.

"Covering Layer Ink Composition"
Vinyl chloride vinyl acetate resin 50.0 parts by mass
Methylethylketone 30.0 parts by mass
Ethyl acetate 20.0 parts by mass Example 2

The laminate was obtained in a manner similar to that in Example 1, except that the second region of the relief structure forming layer was segmented into three subregions of a "region 2-1", a "region 2-2", and a "region 2-3", and that the structures of the respective regions were provided as described below:

"Region 2-1": A corrugated plate structure extending in a direction inclined by 25° with respect to the direction of conveyance of the film by the vapor deposition machine, and having the depth of 120 nm and the pitch of 700 nm;

"Region 2-2": A corrugated plate structure extending in a direction inclined by 70° with respect to the direction of conveyance of the film by the vapor deposition machine, and having the depth of 120 nm and the pitch of 700 nm; and "Region 2-3": A corrugated plate structure extending in a direction inclined by 90° with respect to the direction of conveyance of the film by the vapor deposition machine, and having the depth of 120 nm and the pitch of 700 nm.

Example 3

The laminate was obtained in a manner similar to that in Example 2, except that the first region of the relief structure forming layer was segmented into two subregions of a "region 1-1" and a "region 1-2", and that the structures of the respective regions were provided as described below:

"Region 1-1": A corrugated plate structure extending in the direction of conveyance of the film by the vapor deposition machine, and having the depth of 120 nm and the pitch of 700 nm; and "Region 1-2": A corrugated plate structure extending in a direction inclined by 5° with respect to the direction of conveyance of the film by the vapor deposition machine, and having the depth of 120 nm and the pitch of 700 nm.

Example 4

The laminate was obtained in a manner similar to that in Example 3, except that the pitch of the corrugated plate structure in each of the three subregions of the "region 2-1", the "region 2-2", and the "region 2-3" was set to 1000 μm.

Example 5

The laminate was obtained in a manner similar to that in Example 3, except that the pitch of the corrugated plate structure in each of the two subregions of the "region 1-1" and the "region 1-2" was set to 1000 μm.

Example 6

The laminate was obtained in a manner similar to that in Example 1, except that the first region of the relief structure forming layer was formed into a corrugated plate structure having the depth of 120 nm and the pitch of 700 nm, with a cross-grating structure in which the grooves (the recessed portions) of the corrugated plate structure extended in two directions of ±10° with respect to the direction of conveyance of the film by the vapor deposition machine, and that the second region of the relief structure forming layer was formed into a corrugated plate structure having the depth of 120 nm and the pitch of 700 nm, with a cross-grating structure in which the grooves (the recessed portions) of the corrugated plate structure extended in two directions of 80° and 90° with respect to the direction of conveyance of the film by the vapor deposition machine.

Example 7

The laminate was obtained in a manner similar to that in Example 1, except that the first region of the relief structure forming layer was formed into a corrugated plate structure extending in the direction of conveyance of the film by the vapor deposition machine, and having the depth of 170 nm and the pitch of 650 nm, and that the second region of the relief structure forming layer was formed into a corrugated plate structure extending in a direction orthogonal to the direction of conveyance of the film by the vapor deposition machine, and having the depth of 170 nm and the pitch of 650 nm.

Example 8

The laminate was obtained in a manner similar to that in Example 1, except that the first region of the relief structure forming layer was formed into a scattering structure including a corrugated plate structure extending in the direction of conveyance of the film by the vapor deposition machine, and having the depths in a range from 130 nm to 165 nm and the pitches in a range from 230 nm to 400 nm, and that the second region of the relief structure forming layer was formed into a scattering structure including a corrugated plate structure extending in the direction orthogonal to the direction of conveyance of the film by the vapor deposition machine, and having the depths in a range from 130 nm to 165 nm and the pitches in a range from 230 nm to 400 nm.

Example 9

The laminate was obtained in a manner similar to that in Example 1, except that the first region of the relief structure forming layer was formed into the corrugated plate structure extending in the direction of conveyance of the film by the vapor deposition machine, and having the depth of 170 nm and the pitch of 650 nm, and that the second region of the relief structure forming layer was formed into the scattering structure including the corrugated plate structure extending in the direction orthogonal to the direction of conveyance of the film by the vapor deposition machine, and having the depths in the range from 130 nm to 165 nm and the pitches in the range from 230 nm to 400 nm.

<Items and Results of Evaluations>

The following evaluations were made on the laminates of Examples 1 to 9.

(Evaluations on Selective Removal of First Layer)

The laminates obtained in Examples 1 to 9 were subjected to evaluations as to whether or not the first layer (the aluminum layer) was not removed in the first region and the first layer (the aluminum layer) was removed in the second region (hereinafter also referred to as "selective removal of the first layer"). To be more precise, visible light transmittance was measured in terms of portions corresponding to the "first region" and the "second region" of each laminate, and each laminate was evaluated on the basis of the following criteria.

Among the laminates, those having the transmittance at the portion corresponding to the "first region" above 90% and the transmittance at the portion corresponding to the "second region" equal to below 20% were evaluated as "∘ (good)" while the rest were evaluated as "x (insufficient)".

The results are shown in Table 1 below.

(Evaluation of Positional Accuracy of First Layer)

The laminates obtained in Examples 1 to 9 were subjected to evaluations on positional accuracy of the first layer. To be more precise, each laminate was subjected to measurement of a maximum value of the shortest distance from the contour of the first layer to a boundary between the "first region" and the "region", and the positional accuracy of the first layer was evaluated on the basis of the following criteria.

A case of causing a position gap below 20 μm was evaluated as "∘ (good)" while a case of causing a position gap equal to or above 20 μm was evaluated as "x (insufficient)".

The results are shown in Table 1 below.

Further, according to the manufacturing method of a laminate of present invention, the first layer can be selectively removed from the first region even when the aspect ratios of the relief structure forming layer in the first region and in the second region are equal to each other (Examples 1 to 3, and 6 to 8) or when the aspect ratio in the second region is larger than that in the first region (Examples 5 and 9). This cannot be achieved by a conventional method that is capable of leaving the first layer (the metal reflective layer) only in a region that includes the indented structure with a smaller aspect ratio by use of a difference in aspect ratio between the respective regions, namely, the first region and the second region.

The laminate of Example 8 has the aspect ratio in the range from 0.41 to 0.57, which is higher than an aspect ratio in a range from about 0.1 to 0.3 usually applied to a diffraction grating. Such an indented structure with the large aspect ratio can possibly constitute either a lens such as a prism structure or a scattering structure that scatters light in specific directions. Accordingly, freedom of design is

TABLE 1

| LAMINATE | ANGLE OF DIRECTION OF EXTENSION OF CORRUGATED STRUCTURE WITH RESPECT TO DIRECTION OF CONVEYANCE OF LAMINATE | | ASPECT RATIO OF RELIEF STRUCTURE FORMING LAYER | | EVALUATION RESULT | |
|---|---|---|---|---|---|---|
| | FIRST REGION | SECOND REGION | FIRST REGION | SECOND REGION | SELECTIVE REMOVAL OF FIRST LAYER | POSITIONAL ACCURACY OF FIRST LAYER |
| EXAMPLE 1 | 0° | 90° | 0.17 | 0.17 | ∘ | ∘ |
| EXAMPLE 2 | 0° | 25° 70° 90° | 0.17 | 0.17 | ∘ | ∘ |
| EXAMPLE 3 | 0° 5° | 25° 70° 90° | 0.17 | 0.17 | ∘ | ∘ |
| EXAMPLE 4 | 0° 5° | 25° 70° 90° | 0.17 | 0.12 | ∘ | ∘ |
| EXAMPLE 5 | 0° 5° | 25° 70° 90° | 0.12 | 0.17 | ∘ | ∘ |
| EXAMPLE 6 | ±10° | 80° 90° | 0.17 | 0.17 | ∘ | ∘ |
| EXAMPLE 7 | 0° | 90° | 0.26 | 0.26 | ∘ | ∘ |
| EXAMPLE 8 | 0° | 90° | 0.41-0.57 | 0.41-0.57 | ∘ | ∘ |
| EXAMPLE 9 | 0° | 90° | 0.26 | 0.41-0.57 | ∘ | ∘ |

The "aspect ratio" in Table 1 means an average value of ratios of the depths to the pitches of the grooves.

As can be seen from Table 1, each of the laminates obtained in Examples 1 to 9 had the visible light transmittance in excess of 90% in the first region and the visible light transmittance equal to or below 20% in the second region. In the meantime, when external appearance of each laminate was observed, the first layer in the second region remained in its entirety without being partially removed. Accordingly, the laminates obtained in Examples 1 to 9 are deemed to achieve favorable selective removal of the first layer and have favorable positional accuracy of the first layer.

As described above, the laminates obtained in Examples 1 to 9 are excellent both in the selective removal of the first layer and in the positional accuracy of the first layer.

increased when such a structure can retain the first layer, and the laminate is hence applicable to various uses.

Moreover, present invention does not always require the indented structure with a high aspect ratio, and therefore has advantages of being capable of reducing the thickness of an end product, achieving lower costs, and so forth.

REFERENCE SIGNS LIST

2 relief structure forming layer

4 first layer

6 second layer

10 laminate

The invention claimed is:

1. A method of manufacturing a laminate comprising a relief structure forming layer having a principal surface including first and second regions, and a first layer provided either only in the second region or in the second region as well as in part of the first region of the relief structure forming layer, wherein the method comprises:
   a step (a) of forming the relief structure forming layer comprising
      the first region having an indented structure extending in a first direction or a direction tilted by an angle within 10 degrees to left or right from the first direction in a plan view, and
      the second region having at least one of a flat surface and an indented structure extending in a second direction orthogonal to the first direction or a direction tilted by an angle within 65 degrees to left or right from the second direction in a plan view;
   a step (b) of forming a first material laminate having a surface shape corresponding to a surface shape of the relief structure forming layer, by depositing a first material different from a material of the relief structure forming layer in first and second regions of the relief structure forming layer;
   a step (c) of locating the first material laminate in a vapor-phase deposition apparatus such that the first direction in the step (a) coincides with a direction of conveyance of the first material laminate;
   a step (d) of forming a second material laminate by conveying the located first material laminate and performing vapor-phase deposition of a second material different from the first material from an oblique direction onto a surface of the first material laminate on which the first material is deposited;
   a step (e) of forming a laminate comprising the first layer and a second layer in this order, the layers being provided either only in the second region or in the second region and in part of the first region of the relief structure forming layer, by exposing the second material laminate to a reactive gas or a reactive liquid being reactive with the first material; and
   a step (f) of removing the second layer from the laminate formed in the step (e).

2. A method of manufacturing a laminate comprising a relief structure forming layer having a principal surface including first and second regions, and a first layer and a second layer provided in this order either only in the second region or in the second region as well as in part of the first region of the relief structure forming layer, wherein the method comprises:
   a step (a) of forming the relief structure forming layer comprising
      the first region having an indented structure extending in a first direction or a direction tilted by an angle within 10 degrees to left or right from the first direction in a plan view, and
      the second region having at least one of a flat surface and an indented structure extending in a second direction orthogonal to the first direction or a direction tilted by an angle within 65 degrees to left or right from the second direction in a plan view;
   a step (b) of forming a first material laminate having a surface shape corresponding to a surface shape of the relief structure forming layer, by depositing a first material different from a material of the relief structure forming layer in first and second regions of the relief structure forming layer;
   a step (c) of locating the first material laminate in a vapor-phase deposition apparatus such that the first direction in the step (a) coincides with a direction of conveyance of the first material laminate;
   a step (d) of forming a second material laminate by conveying the located first material laminate and performing vapor-phase deposition of a second material different from the first material from an oblique direction onto a surface of the first material laminate on which the first material is deposited; and
   a step (e) of exposing the second material laminate to a reactive gas or a reactive liquid being reactive with the first material.

* * * * *